(12) United States Patent
Todoroki

(10) Patent No.: US 8,111,931 B2
(45) Date of Patent: Feb. 7, 2012

(54) IMAGE PROCESSING DEVICE

(75) Inventor: Akinari Todoroki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 903 days.

(21) Appl. No.: 12/141,328

(22) Filed: Jun. 18, 2008

(65) Prior Publication Data
US 2009/0016619 A1 Jan. 15, 2009

(30) Foreign Application Priority Data

Jul. 9, 2007 (JP) .................................. 2007-179842

(51) Int. Cl.
G06K 9/36 (2006.01)
(52) U.S. Cl. ...................................................... 382/233
(58) Field of Classification Search ........... 382/232–253
See application file for complete search history.

(56) References Cited

U.S. PATENT DOCUMENTS

| | | | | |
|---|---|---|---|---|
| 5,768,435 | A * | 6/1998 | Murray ........................ | 382/243 |
| 7,075,993 | B2 * | 7/2006 | O'Brien, Jr. .............. | 375/240.27 |
| 2002/0061062 | A1 * | 5/2002 | O'Brien ................... | 375/240.01 |
| 2004/0212843 | A1 | 10/2004 | Kodama et al. | |
| 2004/0213467 | A1 | 10/2004 | Tanaka et al. | |
| 2006/0093045 | A1 * | 5/2006 | Anderson et al. ........ | 375/240.28 |
| 2006/0110050 | A1 * | 5/2006 | Aoyama et al. ............... | 382/232 |
| 2008/0199091 | A1 * | 8/2008 | Srinivasan et al. ........... | 382/239 |
| 2009/0297054 | A1 * | 12/2009 | Regunathan et al. ......... | 382/248 |

FOREIGN PATENT DOCUMENTS

| | | |
|---|---|---|
| JP | A-07-271953 | 10/1995 |
| JP | A 2003-084738 | 3/2003 |
| JP | A-2004-228717 | 8/2004 |
| JP | A-2004-328178 | 11/2004 |
| JP | A-2005-094212 | 4/2005 |

* cited by examiner

*Primary Examiner* — Jingge Wu
(74) *Attorney, Agent, or Firm* — Oliff & Berridge, PLC

(57) ABSTRACT

An image processing device and method decodes encoded image data, and converts a resolution of the decoded image data. The encoded image data is formed by encoding image data partitioned into blocks, each block including a plurality of pixels aligned in a matrix shape. The image processing device includes a decoding section that decodes and cuts out a portion of the decoded image data corresponding to a preset cut-out area and outputs the portion of the decoded image data on a block-by-block basis, a block buffer section that temporarily stores the portion of the decoded image data output, a horizontal resolution conversion section that converts the resolution of the decoded image data in the horizontal direction, a line buffer section that temporarily stores the horizontal-resolution-converted image data, and a vertical resolution conversion section that converts the resolution of the horizontal-resolution-converted image data in the vertical direction.

20 Claims, 13 Drawing Sheets

ENCODING MODE:
YUV444,YUV422,YUV411,Grayscale

| MCU | | | | | | | | | |
|---|---|---|---|---|---|---|---|---|---|
| B00 (1) | B10 (2) | B20 (3) | B30 (4) | B40 (5) | B50 (6) | B60 (7) | B70 (8) | B80 (9) | B90 (10) |
| B01 (11) | B11 (12) | B21 (13) | B31 (14) | B41 (15) | B51 (16) | B61 (17) | B71 (18) | B81 (19) | B91 (20) |
| B02 (21) | B12 (22) | B22 (23) | B32 (24) | B42 (25) | B52 (26) | B62 (27) | B72 (28) | B82 (29) | B92 (30) |
| B03 (31) | B13 (32) | B23 (33) | B33 (34) | B43 (35) | B53 (36) | B63 (37) | B73 (38) | B83 (39) | B93 (40) |
| B04 (41) | B14 (42) | B24 (43) | B34 (44) | B44 (45) | B54 (46) | B64 (47) | B74 (48) | B84 (49) | B94 (50) |
| B05 (51) | B15 (52) | B25 (53) | B35 (54) | B45 (55) | B55 (56) | B65 (57) | B75 (58) | B85 (59) | B95 (60) |
| B06 (61) | B16 (62) | B26 (63) | B36 (64) | B46 (65) | B56 (66) | B66 (67) | B76 (68) | B86 (69) | B96 (70) |
| B07 (71) | B17 (72) | B27 (73) | B37 (74) | B47 (75) | B57 (76) | B67 (77) | B77 (78) | B87 (79) | B97 (80) |

— CUT-OUT AREA (BLOCK BASIS)

FIG. 4A

ENCODING MODE: YUV420

| MCU | | | | | | | | | |
|---|---|---|---|---|---|---|---|---|---|
| B00 (1) | B10 (2) | B20 (5) | B30 (6) | B40 (9) | B50 (10) | B60 (13) | B70 (14) | B80 (17) | B90 (18) |
| B01 (3) | B11 (4) | B21 (7) | B31 (8) | B41 (11) | B51 (12) | B61 (15) | B71 (16) | B81 (19) | B91 (20) |
| B02 (21) | B12 (22) | B22 (25) | B32 (26) | B42 (29) | B52 (30) | B62 (33) | B72 (34) | B82 (37) | B92 (38) |
| B03 (23) | B13 (24) | B23 (27) | B33 (28) | B43 (31) | B53 (32) | B63 (35) | B73 (36) | B83 (39) | B93 (40) |
| B04 (41) | B14 (42) | B24 (45) | B34 (46) | B44 (49) | B54 (50) | B64 (53) | B74 (54) | B84 (57) | B94 (58) |
| B05 (43) | B15 (44) | B25 (47) | B35 (48) | B45 (51) | B55 (52) | B65 (55) | B75 (56) | B85 (59) | B95 (60) |
| B06 (61) | B16 (62) | B26 (65) | B36 (66) | B46 (69) | B56 (70) | B66 (73) | B76 (74) | B86 (77) | B96 (78) |
| B07 (63) | B17 (64) | B27 (67) | B37 (68) | B47 (71) | B57 (72) | B67 (75) | B77 (76) | B87 (79) | B97 (80) |

— CUT-OUT AREA (BLOCK BASIS)

FIG. 4B

IMAGE PROCESSING DEVICE

This application claims the benefit of JP 2007-179842 filed in Japan on Jul. 9, 2007, the entire disclosure of which is hereby incorporated by reference in its entirety.

BACKGROUND

1. Technical Field

The present invention relates to an image processing device that decodes image data having been encoded by any predetermined encoding format, and at the same time, subjects the resulting decoded image data to resolution conversion to make the data of any predetermined image data size.

2. Related Art

When any decoded image data is not in a desired image data size, resolution conversion is performed to make the decoded image data to be in the desired image data size. Such resolution conversion is performed in an image display device that decodes encoded image data by various types of formats such as JPEG (Joint Photographic Experts Group), and displays an image of the resulting decoded image data, and an image processing device such as printing device that prints the image of the decoded image data. In the below, this image data size is referred also to as "resolution".

The function of such resolution conversion is generally implemented by, in an image processing device, decoding encoded image data in its entirety, temporarily storing the resulting decoded image data in its entirety into a memory, and reading the decoded image data stored in the memory for resolution conversion.

The function of such resolution conversion can be also implemented by, while decoding encoded image data of a JPEG format on the basis of an MCU (Minimum Coded Unit), subjecting the resulting image data to resolution conversion with a unit of an 8-by-8 pixel block configuring an MCU. Patent Document 1 (JP-A-2003-84738) also describes such an example.

The problem with the image processing device of such a general configuration as above is that the decoded image data is required to be entirely stored on a temporary basis in a memory, thereby needing a memory of a large capacity corresponding to the size of the decoded image data. With the entire decoded image data temporarily stored in the memory as such, resolution conversion is performed by reading the decoded image data stored in the memory. As a result, the larger size of the decoded image data, i.e., the higher resolution, increases the frequency of accessing the memory. This thus requires a longer time for memory access as such, and the longer time needed for such access prevents the increase of the processing speed in the entire image processing device. This results in the need for restricting the range of resolution available for conversion for an image represented by the decoded image data.

Another issue here is that, with the image processing device of Patent Document 1, resolution conversion is performed on the basis of a block. This indeed achieves resolution conversion of decoded image data with a small-capacity memory, and relaxes restrictions on the range of resolution available for conversion. However, this easily causes a noise (referred also to as "block noise") that impairs the pixel continuity in an image at the border of the blocks, thereby possibly deteriorating the quality of the image after resolution conversion.

SUMMARY

An advantage of some aspects of the invention is to provide a technology that can decode any encoded image data and subject the resulting decoded image data to resolution conversion to make the data of any predetermined image data size by using a memory smaller in capacity than the size of the decoded image data while preventing generation of block noise.

APPLICATION EXAMPLE 1

An image processing device of Application Example 1 decodes encoded image data, and converts a resolution of the decoded image data, the encoded image data being formed by encoding image data partitioned into blocks that are arranged in a rectangular array extending in a horizontal and a vertical direction, and each block including a plurality of pixels aligned in a shape of a matrix having horizontal rows and vertical columns, the image processing device comprising: a decoding section that cuts out, while decoding the encoded image data, a portion of the decoded image data corresponding to a preset cut-out area, and outputs the portion of the decoded image data in order on a block-by-block basis; a block buffer section that temporarily stores, on a basis of the blocks, at least a part of the blocks of at least one horizontal row of the rectangular array out of the portion of the decoded image data cut out in order on the block-by-block basis in accordance with an order of arrangement of the blocks in the rectangular array; a horizontal resolution conversion section that converts the resolution of the portion of the decoded image data in the horizontal direction by filtering a part of the blocks of the decoded image data stored in the block buffer section corresponding to pixels aligned in a same horizontal row; a line buffer section that temporarily stores, on a basis of the vertical columns, horizontal-resolution-converted image data that corresponds to at least part of the vertical columns out of horizontal-resolution-converted image data that results from the horizontal resolution conversion performed by the horizontal resolution conversion section and that is configured by the image data of the pixels aligned in the matrix of the horizontal rows and the vertical columns; and a vertical resolution conversion section that converts the resolution of the horizontal-resolution-converted image data in the vertical direction by filtering, the horizontal-resolution-converted image data stored in the line buffer section that forms part of the vertical columns, the filtered horizontal-resolution-converted image data corresponding to the pixels aligned in a same vertical column.

With the image processing device of Application Example 1, any encoded image data can be decoded, and in the resulting decoded image data, any portion corresponding to a preset cut-out area can be subjected to resolution conversion to be of any desired image data size by using a memory smaller in capacity than the size of the decoded image data while preventing generation of block noise.

APPLICATION EXAMPLE 2

In the image processing device of Application Example 2, in Application Example 1, the decoding section determining, on the basis of the blocks, whether the decoded image data lies within the cut-out area, and only cutting out from the decoded image data and outputting in order on the block-by-block basis blocks determined as lying within the cut-out area.

With the image processing device of Application Example 2, from the portion of the decoded image data, any part corresponding to a preset cut-out area can be cut out with ease, and the cut-out result can be output in order on a block basis.

APPLICATION EXAMPLE 3

In the image processing device of Application Example 3, in either Application Example 1 or 2, in response to a request issued from the horizontal resolution conversion section, the block buffer section reading any part of the blocks of decoded image data temporarily stored in the block buffer section that correspond to any of a number of pixels needed for horizontal resolution conversion and outputting a result of the reading to the horizontal resolution conversion section.

With the image processing device of Application Example 3, in response to a request coming from the horizontal resolution conversion section, from the portion of the decoded image data only of a part of the blocks in a temporary storage, the portion of the decoded image data corresponding to a plurality of pixels in need can be forwarded with ease to the horizontal resolution conversion section.

APPLICATION EXAMPLE 4

In the image processing device of Application Example 4, in Application Example 3, when the number of pixels needed for horizontal resolution conversion includes pixels that are located left of a left end of an image of the image data or located right of a right end of the image of the image data, the block buffer section performing a horizontal mirroring process that allocates, to the pixels located left of the left end, the portion of the decoded image data of the pixels aligned in the same horizontal row from the left end toward the right end in a reverse order, and allocating to the pixels located right of the right end, the portion of the decoded image data of the pixels aligned in the same horizontal row from the right end toward the left end in a reverse order.

With the image processing device of Application Example 4, by converting the horizontal resolution, any noise can be prevented from occurring in the left or right end portion of an image lying in the cut-out area.

APPLICATION EXAMPLE 5

In the image processing device of Application Example 5, in any one of Application Examples 1 to 4, in response to a request issued from the vertical resolution conversion section, the line buffer section reading any part of horizontal-resolution-converted image data temporarily stored in the line buffer section corresponding to any of a number of pixels needed for vertical resolution conversion and outputting a result of the reading to the vertical resolution conversion section.

With the image processing device of Application Example 5, in response to a request coming from the vertical resolution conversion section, from the horizontal-resolution-converted image data of a part of the vertical columns in a temporary storage, the horizontal-resolution-converted image data corresponding to a plurality of pixels in need can be forwarded with ease to the vertical resolution conversion section.

APPLICATION EXAMPLE 6

In the image processing device of Application Example 6, in Application Example 5, when the number of pixels needed for vertical resolution conversion includes pixels that are located above an upper end of an image of the image data or located below a lower end of the image of the image data, the line buffer section performing a vertical mirroring process that allocates, to the pixels located above the upper end, the horizontal-resolution-converted image data of the pixels aligned in the same vertical column from the upper end toward the lower end in a reverse order, and allocates to the pixels located below the lower end, the horizontal-resolution-converted image data of the pixels aligned in the same vertical column from the lower end in the upward direction in a reverse order.

With the image processing device of Application Example 6, by converting the vertical resolution, any noise can be prevented from occurring in the upper or lower end portion of an image lying in the cut-out area.

Note here that the invention can be implemented not only by such an image processing device but also by an image processing method.

BRIEF DESCRIPTION OF THE DRAWINGS

The invention will be described with reference to the accompanying drawings, wherein like numbers reference like elements.

FIGS. 4A and 4B are each a diagram for illustrating an encoding mode;

DETAILED DESCRIPTION OF EMBODIMENTS

In the below, a most preferred embodiment of the invention is described by way of an example in the following order:
A. Configuration of Image Processing Device:
B. Processing Operation of Resolution Conversion:
C. Modified Example:

A. Configuration of Image Processing Device

Figure 1:
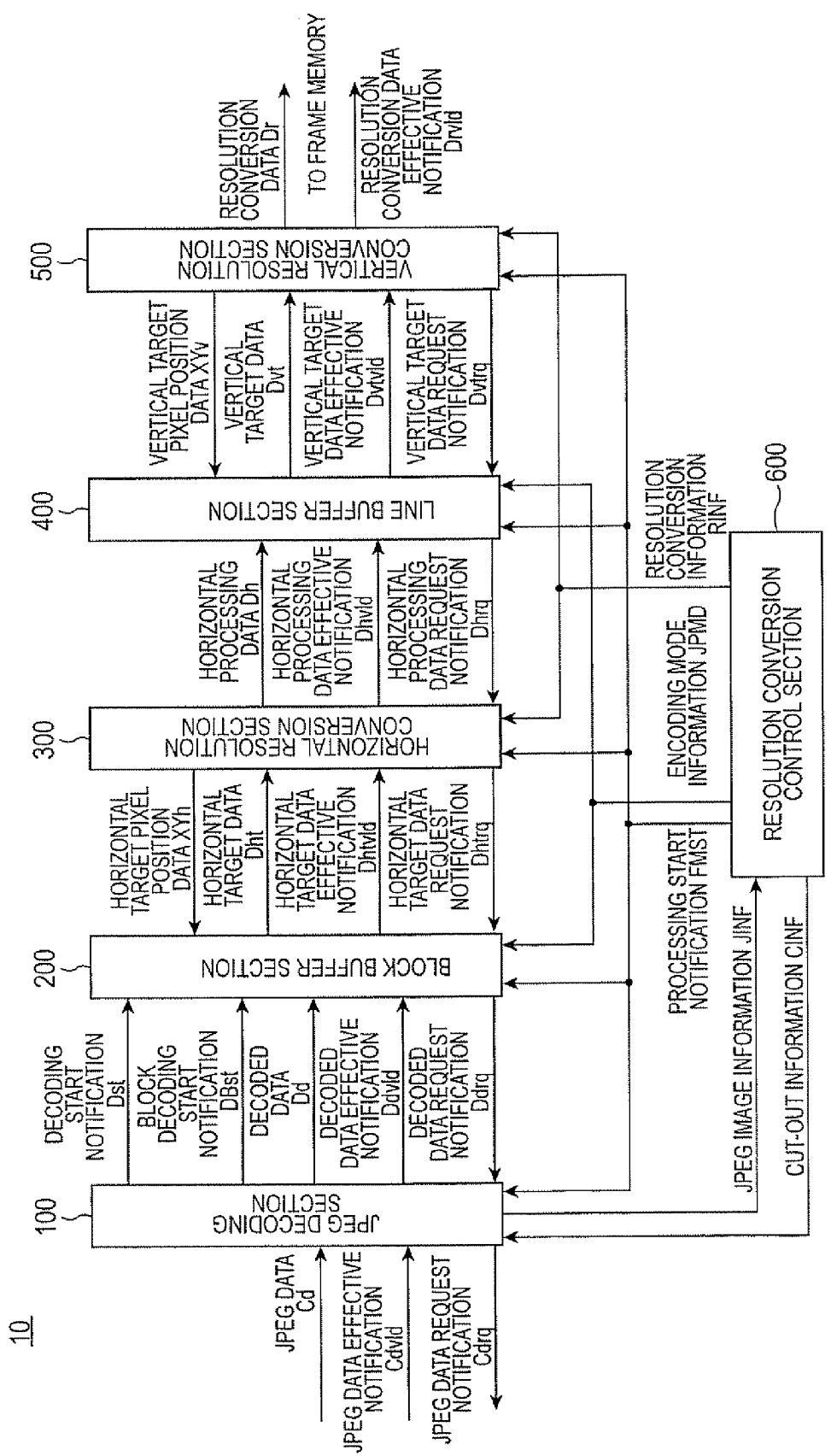
FIG. 1 is a block diagram showing an image processing device 10 as an embodiment of the invention.

FIG. 1 is a block diagram showing an image processing device 10 as an embodiment of the invention. The image processing device 10 of FIG. 1 is configured to include a JPEG decoding section 100, a block buffer section 200, a horizontal resolution conversion section 300, a line buffer section 400, a vertical resolution conversion section 500, and a resolution conversion control section 600. This image processing device 10 configures a part of an image processing apparatus for use in a projector. The image processing device 10 serves as a resolution conversion device that decodes any encoded image data of a JPEG format, and at the same time, performs resolution conversion sequentially with respect to the resulting decoded image data (hereinafter, referred to as "decoded data").

The resolution conversion control section 600 includes a CPU (Central Processing Unit) and a memory that are not shown, and operates in accordance with a control program stored in the memory, thereby controlling the operation of the blocks, i.e., the JPEG decoding section 100, the block buffer section 200, the horizontal resolution conversion section 300, the line buffer section 400, and the vertical resolution conversion section 500. Note here that, although the resolution conversion control section 600 and these blocks are connected by various types of signal lines, the drawing shows only signal lines needed for the description below, i.e., signal lines for transmission of a processing start notification FMST, JPEG image information JINF, cut-out information CINF, encoding mode information JPMD, and resolution conversion information RINF.

The JPEG decoding section 100 is a function block of receiving a piece of image data that has been encoded in accordance with a JPEG format to be of any arbitrary size (hereinafter referred to simply as "encoded image data"), decoding thus input encoded image data, and sequentially outputting the resulting decoded image data (hereinafter, referred to simply as "decoded image data") on the basis of a block that will be described later.

Figure 2:
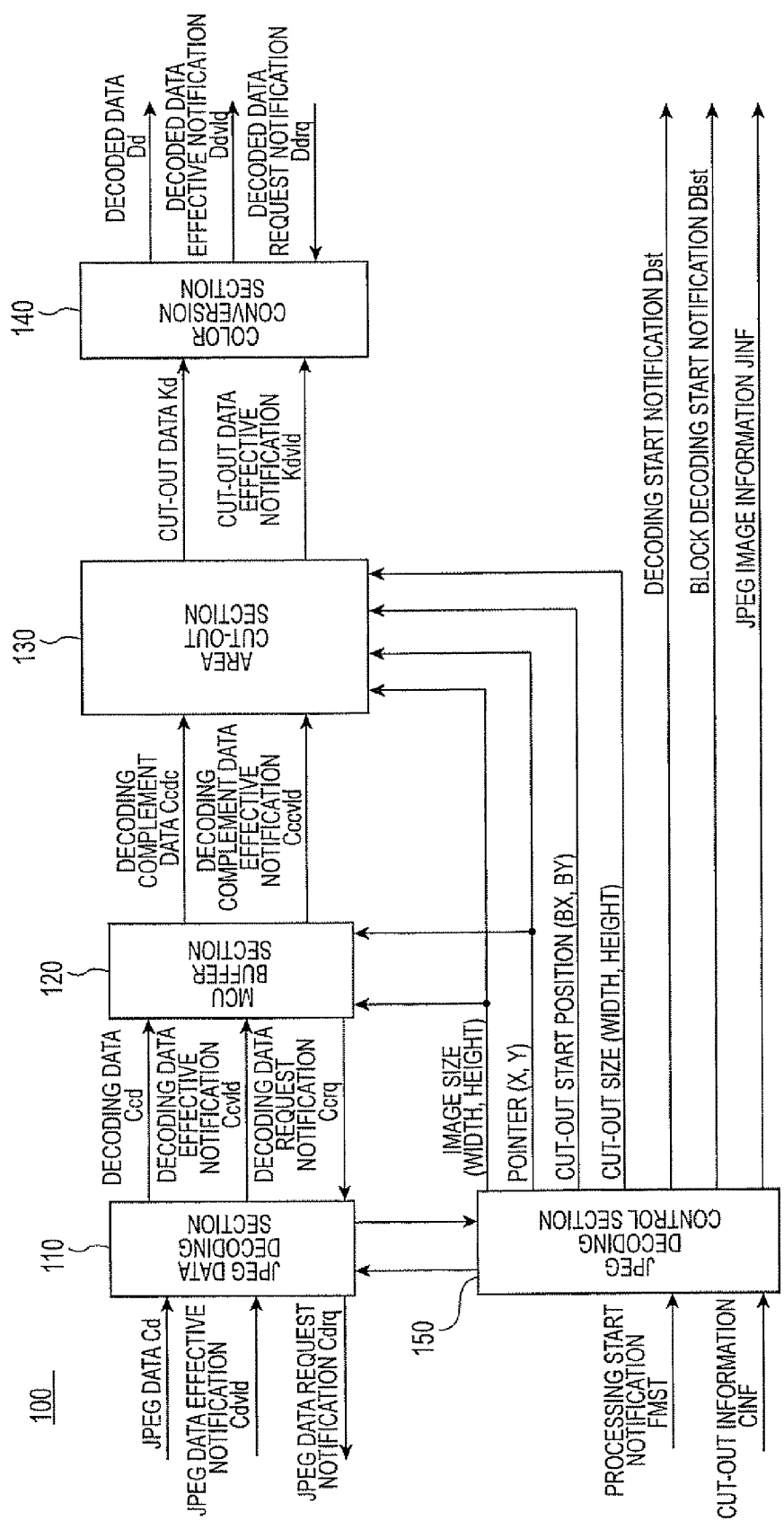
FIG. 2 is a block diagram showing the internal configuration of a JPEG decoding section 100.

FIG. 2 is a block diagram showing the internal configuration of the JPEG decoding section 100. This JPEG decoding section 100 is configured to include a JPEG data decoding section 110, an MCU buffer section 120, an area cut-out section 130, a color conversion section 140, and a JPEG decoding control section 150.

The JPEG decoding control section 150 controls over the operation of the components, i.e., the JPEG data decoding section 110, the MCU buffer section 120, the area cut-out section 130, and the color conversion section 140. Such operation control is applied based on the processing start notification FMST and the cut-out information CINF coming from the resolution conversion control section 600.

Upon receiving the processing start notification FMST, based thereon, the JPEG decoding control section 150 starts its control operation for a decoding process, and outputs a decoding start notification Dst to the block buffer section 200 on an MCU basis. The JPEG decoding control section 150 acquires, from the JPEG data decoding section 111, an after-decoding image size, i.e., width and height, of the image of encoded image data provided as JPEG data, i.e., JPEG image data. The JPEG decoding control section 150 also acquires a cut-out size, i.e., width and height, and a cut-out start position (BX, BY). The cut-out size indicates the size of the cut-out area, and the cut-out start position indicates the start position for cut-out. Thus acquired image size is supplied to both the MCU buffer section 120 and the area cut-out section 130, and the acquired cut-out size and the cut-out start position are supplied to the area cut-out section 130. Herein, the image size can be acquired by referring to the header of the JPEG data. The cut-out size and the cut-out start position can be acquired by referring to the cut-out information CINF coming from the resolution conversion control section 600.

Figure 3:
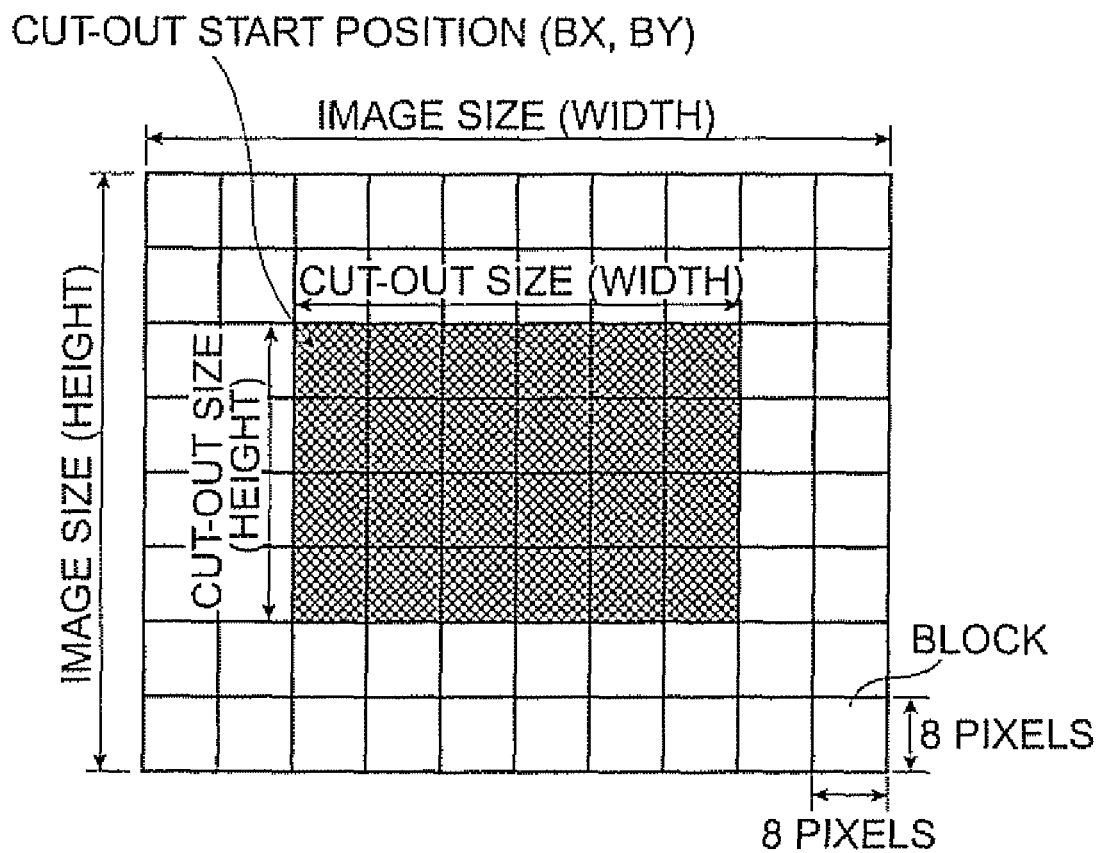
FIG. 3 is a diagram for illustrating an image size and a cut-out size.

FIG. 3 is a diagram for illustrating the image size and the cut-out size. The encoded image data of a JPEG format is a result of processing original before-encoding image data relative to an 8-by-8 pixel block and an MCU configured by the block. Accordingly, the width and height indicating the image size and the cut-out size can be represented by the number of blocks. The cut-out start position can be represented by the horizontal and vertical coordinates (BX, BY) relative to the upper left block, i.e., point of origin. For example, the coordinates (BX, BY) of the cut-out start position in the drawing are (2, 2).

The JPEG decoding control section 150 (FIG. 2) controls the JPEG data decoding section 110 to apply a decoding process to the encoded image data provided for every MCU. The JPEG decoding control section 150 also forwards, to the MCU buffer section 120, a block decoding start notification DBst notifying the start of the decoding process on a block basis, and forwards, to the MCU buffer section 120 and the area cut-out section 130, a pointer (X, Y) indicating the block of a processing target. The block configuration of an MCU is defined in accordance with the encoding mode, and encoding mode information found in the header tells in which encoding mode the incoming JPEG data is. Note here that the encoding mode information is provided to the resolution conversion control section 600 as the JPEG image information JINF together with the image size.

FIGS. 4A and 4B are each a diagram for illustrating the encoding mode. As shown in FIGS. 4A and 4B, the encoding mode is classified into two groups.

As shown in FIG. 4A, the first group is of an MCU including four blocks aligned in the horizontal direction. As shown in FIG. 4B, the second group is of an MCU including 2 by 2 blocks, i.e., two blocks in the horizontal direction and two blocks in the vertical direction. In the drawings, reference characters B00 to B97 assigned to the blocks are those indicating the blocks by coordinates (BX, BY) thereof. For example, the reference character B00 indicates the block with the coordinates of (0, 0). The numbers in parentheses (1 to 80) assigned to the blocks indicate the arrangement order of the blocks.

Because the MCUs are configured differently as such, for the first group, the setting of a cut-out area can be made on a block basis as shown in FIG. 4A, but for the second group, as shown in FIG. 4B, the setting of a cut-out area has to be made on an MCU basis, i.e., on a four-block basis of 2 by 2 blocks. The encoding mode available for the first group includes YUV444, YUV422, YUV411, Grayscale, and others. The encoding mode available for the second group includes YUV420, and others.

As a response to a JPEG data request notification Cdrq forwarded to a JPEG data output device that is not shown, the JPEG data decoding section 110 receives JPEG data Cd coming from the output device on an MCU basis. This data input is made based on a JPEG data effective notification Cdvld provided with the JPEG data Cd. The JPEG data decoding section 110 then decodes thus input JPEG data, i.e., encoded image data, in order on an MCU basis. The resulting decoded image data (hereinafter, referred to as decoded data) Ccd is forwarded to the MCU buffer section 120 as a response to a decoded data request notification Ccrq coming from the MCU buffer section 120. This data output is made together with a decoded data effective notification Ccvld. Note here that the decoded data Ccd coming from the JPEG data decoding section 110 is output in order with a unit of blocks configuring an MCU.

The MCU buffer section 120 sequentially receives the decoded data Ccd coming from the JPEG data decoding section 110. This data input is made based on the decoded data effective notification Ccvld coming together with the decoded data Ccd. Thus input decoded data is complemented with any lacking color-difference data, i.e., U data and V data, in accordance with the encoding mode. The resulting decoded complement data Ccdc is forwarded to the area cut-out section 130 together with a decoded complement data effective notification Cccvld in order on a block basis.

The area cut-out section 130 receives the decoded complement data Ccdc coming from the MCU buffer section 120 based on the decoded complement data effective notification Cccvld. From thus input decoded complement data, the area cut-out section 130 then cuts out the decoded complement data of a block lying on the cut-out area, and forwards the cut-out result, as cut-out data Kd, to the color conversion section 140 together with a cut-out data effective notification Kdvld.

The color conversion section 140 converts data, i.e., YUV data, represented by an intensity (Y) and two color differences (U and V) into data, i.e., RGB data, represented by intensities of colors R (red), G (green), and B (blue). The color conversion section 140 then outputs the conversion result, i.e., RGB data, as decoded data Dd. Herein, the output of the decoded data Dd is made at the same as the output of the decoded data effective notification Ddvld as a response to the decoded data request notification Ddrq coming from the block buffer section 200.

The block buffer section 200 (FIG. 1) is a function block of temporarily storing the decoded data coming from the JPEG decoding section 100 on a block basis, and outputting the data in response to a request from the horizontal resolution conversion section 300.

Figure 5:
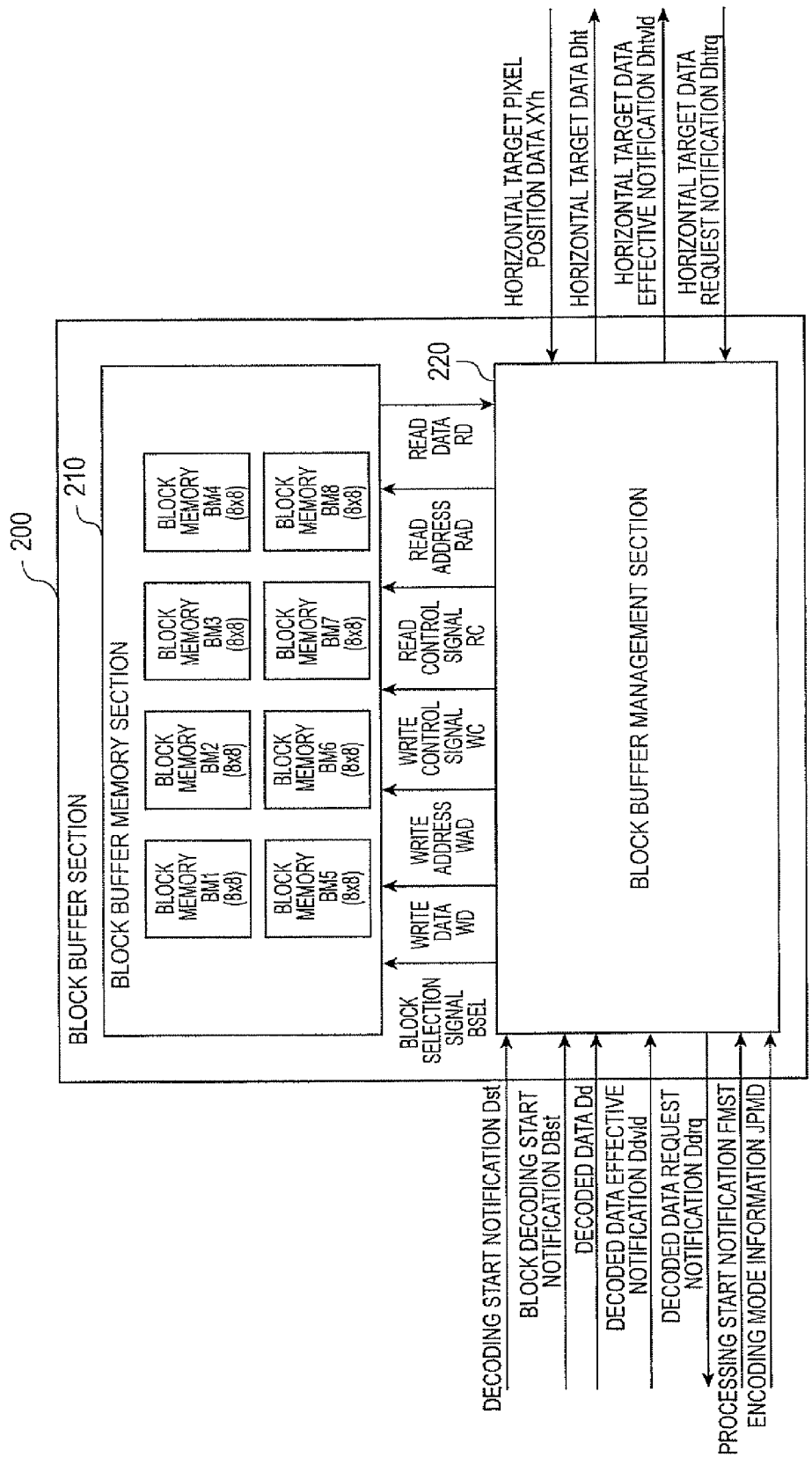
FIG. 5 is a block diagram showing the internal configuration of a block buffer section 200.

FIG. 5 is a block diagram showing the internal configuration of the block buffer section 200. This block buffer section 200 is configured to include a block buffer memory section 210 and a block buffer management section 220.

The block buffer memory section 210 includes eight block memories BM1 to BM8 for storage of decoded data on the basis of a block, i.e., 8-by-8 pixel block. Writing of decoded data to the block memories is made by writing write data, i.e., decoded data, WD coming from the block buffer management section 220 based on a block selection signal BSEL, a write address WAD, and a write control signal WC, all of which come from the block buffer management section 220. Reading of decoded data from the block memories is made based on a read address RAD and a read control signal RC provided by the block buffer management section 220. The resulting read data, i.e., decoded data, RD is supplied to the block buffer management section 220.

The block buffer management section 220 makes an input of the decoded data Dd on a block basis based on inputs of a processing start notification FMST, a decoding start notification Dst, and a block decoding start notification DBst. The input of the decoded data Dd is made by outputting a decoded data request notification Ddrq, and based on a decoded data effective notification Ddvld output at the same time, by responsively capturing the decoded data Dd coming from the JPEG decoding section 100. Thus input decoded data Dd is then written as write data WD into a storage area based on a write control signal WC. The storage area is of an address corresponding to a write address WAD of the block memory selected in accordance with a block selection signal BSEL. Herein, in accordance with encoding mode information JPMD provided in advance by the resolution conversion control section 600, the block buffer management section 220 manages selection of and writing into the block memories storing decoded data on a block basis, and manages which block memory stores which decoded data.

The block buffer management section 220 reads, from the block buffer memory section 210, the decoded data for supply to the horizontal resolution conversion section 300 as horizontal target data Dht, and outputs the reading result as the horizontal target data Dht. This data reading is made based on horizontal target pixel position data XYh and a horizontal target data request notification Dhtrq coming from the horizontal resolution conversion section 300. The output of the horizontal target data Dht serves as a response to the horizontal target data request notification Dhtrq, and the address of the block memory storing pixel data of any pixel needed for generating the image data of horizontal target pixel is output as a read address RAD. The decoded data written in the address is then read based on a read control signal RC. Thus read decoded data is then output as horizontal target data Dht together with a horizontal target data effective notification Dhtvld.

The horizontal resolution conversion section 300 (FIG. 1) converts the horizontal resolution of an image of data decoded by the JPEG decoding section 100. This horizontal-resolution conversion is performed based on resolution conversion information INF coming from the resolution conversion control section 600. This horizontal resolution conversion section 300 can be configured by a general resolution conversion circuit using a digital filter of m taps (where m is an integer of 2 or larger, and m=16 in this example). As such, the horizontal resolution conversion section 300 uses, as a reference, the horizontal target pixel position represented by the horizontal target pixel position data XYh, and receives the decoded data of m pixels located before and after the horizontal target pixel in the horizontal direction as horizontal target data Dht. The image data of horizontal target pixel is thus generated so that the resolution conversion is performed in the horizontal direction.

In response to a horizontal processing data request notification Dhrq coming from the line buffer section 400, the horizontal resolution conversion section 300 forwards, to the line buffer section 400, the image data as a result of resolution conversion as a horizontal processing data Dh together with a horizontal processing data effective notification Dhvld.

The line buffer section 400 is a function block of temporarily storing the horizontal processing data coming from the horizontal resolution conversion section 300 on a line (horizontal row) basis, and outputting the data in response to a request coming from the vertical resolution conversion section 500.

Figure 6:
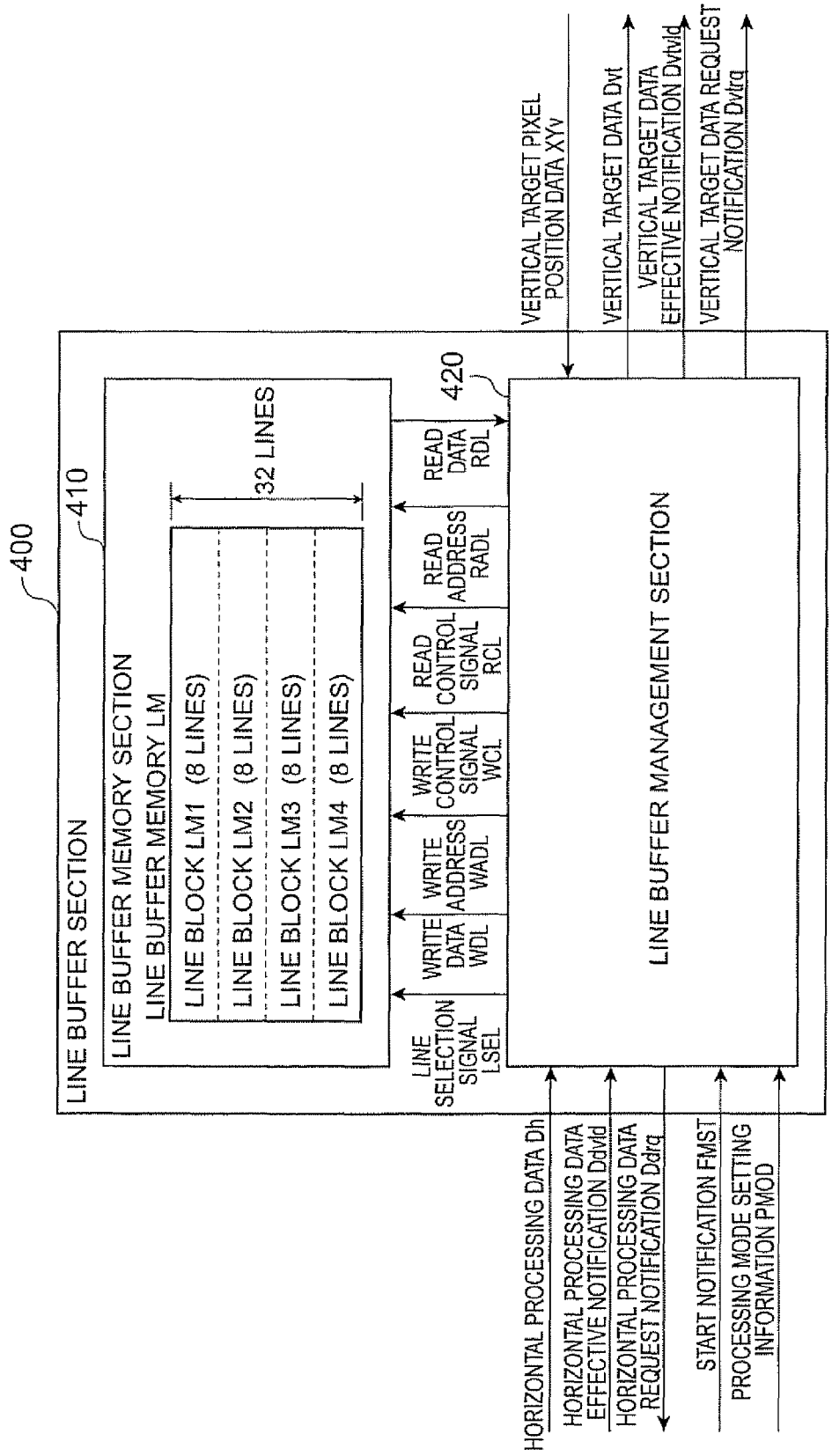
FIG. 6 is a block diagram showing the internal configuration of a line buffer section 400.

FIG. 6 is a block diagram showing the internal configuration of the line buffer section 400. This line buffer section 400 is configured to include a line buffer memory section 410 and a line buffer management section 420.

The line buffer memory section 410 includes a line memory LM for storage of the horizontal processing data on the basis of a horizontal line (hereinafter, simply referred to as "line"). The line memory LM includes a storage area of 32 lines for storing, on a line basis, image data through with resolution conversion in the horizontal direction. The storage area of a line is set in accordance with the maximum value in the horizontal direction of the image data through with resolution conversion in the horizontal direction, i.e., horizontal processing data. Note here that, as described above, the encoding/decoding is performed with a unit of an MCU or blocks configuring an MCU. With a focus in the vertical direction, a block is handled by a unit of eight lines, and thus the line memory LM is indicated by four line blocks LM1 to LM4 as a result of partitioning the line memory by eight lines for convenience. Writing of the horizontal processing data to the line memory is made by writing write data, i.e., horizontal processing data, WDL coming from the line buffer management section 420 based on a line block selection signal LSEL, a write address WADL, and a write control signal WCL, all of which come from the line buffer management section 420. Reading of the horizontal processing data from the line memory is made based on a read address RADL and a read control signal RCL provided by the line buffer management section 420, The resulting read data, i.e., horizontal processing data, RDL is supplied to the line buffer management section 420.

The line buffer management section 420 makes an input of horizontal processing data Dh on a line basis based on the input of a processing start notification FMST. The input of the horizontal processing data Dh is made by outputting a horizontal processing data request notification Dhrq, and based on a horizontal processing data effective notification Dhvld output at the same time, by responsively capturing the horizontal processing data Dh coming from the horizontal resolution conversion section 300. Thus input horizontal processing data Dh is then written, as write data WDL, into a storage area based on a write control signal WCL. The storage area is of an address corresponding to a write address WADL of the line memory selected in accordance with a line block selection signal LSEL. Herein, in accordance with encoding mode information JPMD provided in advance by the resolution conversion control section 600, the line buffer management section 420 manages selection of and writing into the line memory storing the horizontal processing data on a line basis, and manages which line stores which horizontal processing data.

The line buffer management section 420 reads, from the line buffer memory section 410, the horizontal processing data for supply to the vertical resolution conversion section 500 as vertical target data Dvt, and outputs the reading result as vertical target data Dvt. This data reading is made based on vertical target pixel position data XYv and a vertical target data request notification Dvtrq coming from the vertical resolution conversion section 500. The output of the vertical target data Dhv serves as a response to the vertical target data request notification Dvtrq, and the address of the line memory storing image data of any pixel needed for generating the image data of vertical target pixel is output as a read address RADL. The horizontal processing data written in the address is read based on a read control signal RCL. Thus read horizontal processing data is then output as vertical target data Dvt together with a vertical target data effective notification Dvtvld.

The vertical resolution conversion section 500 (FIG. 1) converts the vertical resolution of image data as a result of resolution conversion in the horizontal direction by the horizontal resolution conversion section 300, i.e., the horizontal processing data coming from the line buffer section 400. This resolution conversion is made based on resolution conversion information INF coming from the resolution conversion control section 600. Similarly to the horizontal resolution conversion section 300, this vertical resolution conversion section 500 can be configured by a general resolution conversion circuit using a digital filter of n taps (where n is an integer of 2 or larger, and n=16 in this example). As such, the vertical resolution conversion section 500 uses, as a reference, the vertical target pixel position represented by the vertical target pixel position data XYv, and receives the horizontal processing data of n pixels located above and below the vertical target pixel in the vertical direction as vertical target data Dvt. The image data of vertical target pixel is thus generated so that the resolution conversion is performed in the vertical direction.

The resolution conversion data Dr as a result of resolution conversion by the vertical resolution conversion section 500 in the vertical direction is forwarded to a frame memory together with a resolution conversion data effective notification Drvld. Herein, in the frame memory, the resolution conversion data Dr is input and written based on the resolution conversion data effective notification Drvld.

As such, the image processing device 10 of this embodiment is able to perform resolution conversion while decoding encoded image data included in any input JPEG data.

B. Processing Operation of Resolution Conversion

Figure 7:
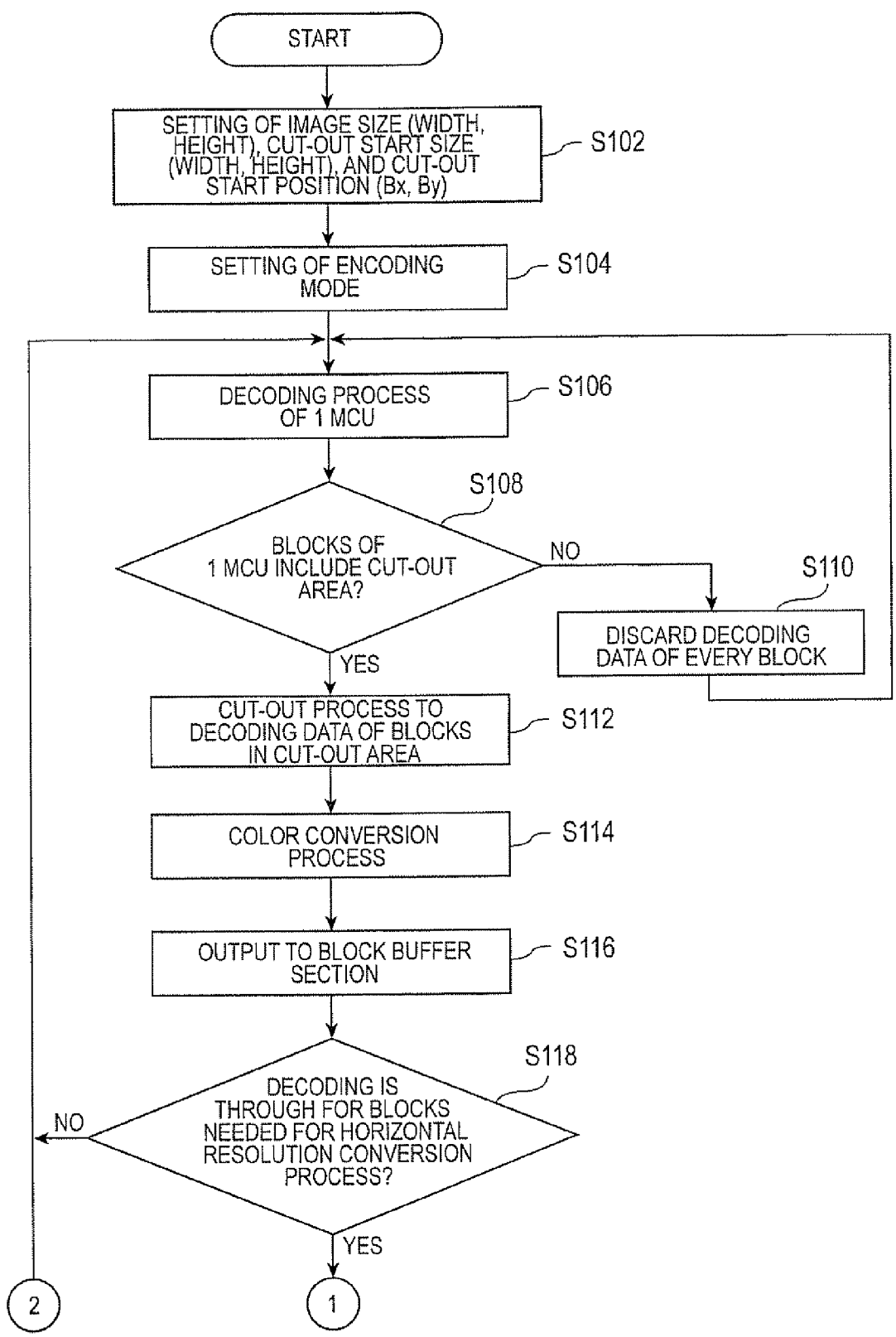
FIG. 7 is a diagram for illustrating the processing operation of each block in a resolution conversion process by the image processing device 10.
Figure 8:
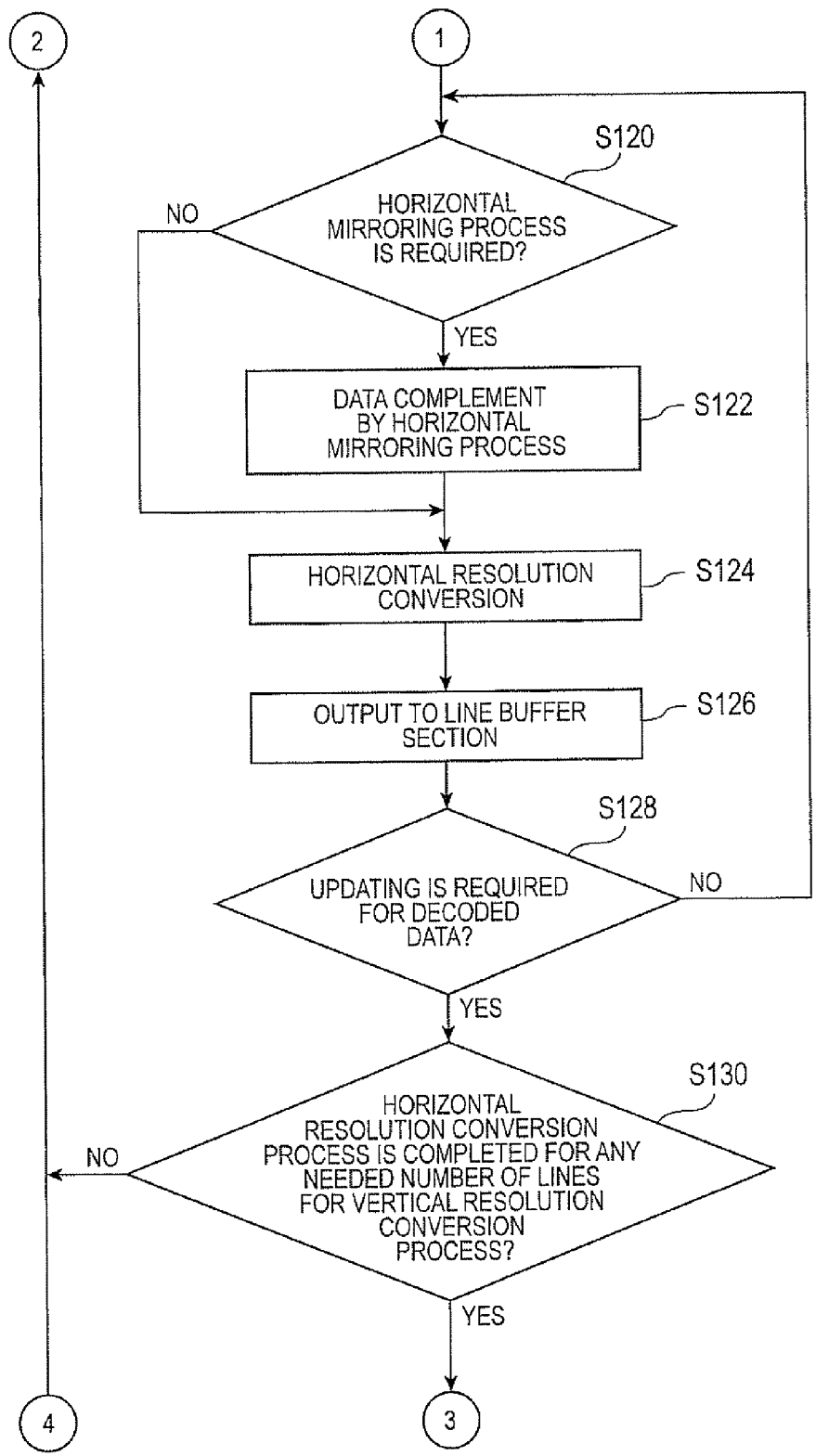
FIG. 8 is another diagram for illustrating the processing operation of each block in the resolution conversion process by the image processing device 10.
Figure 9:
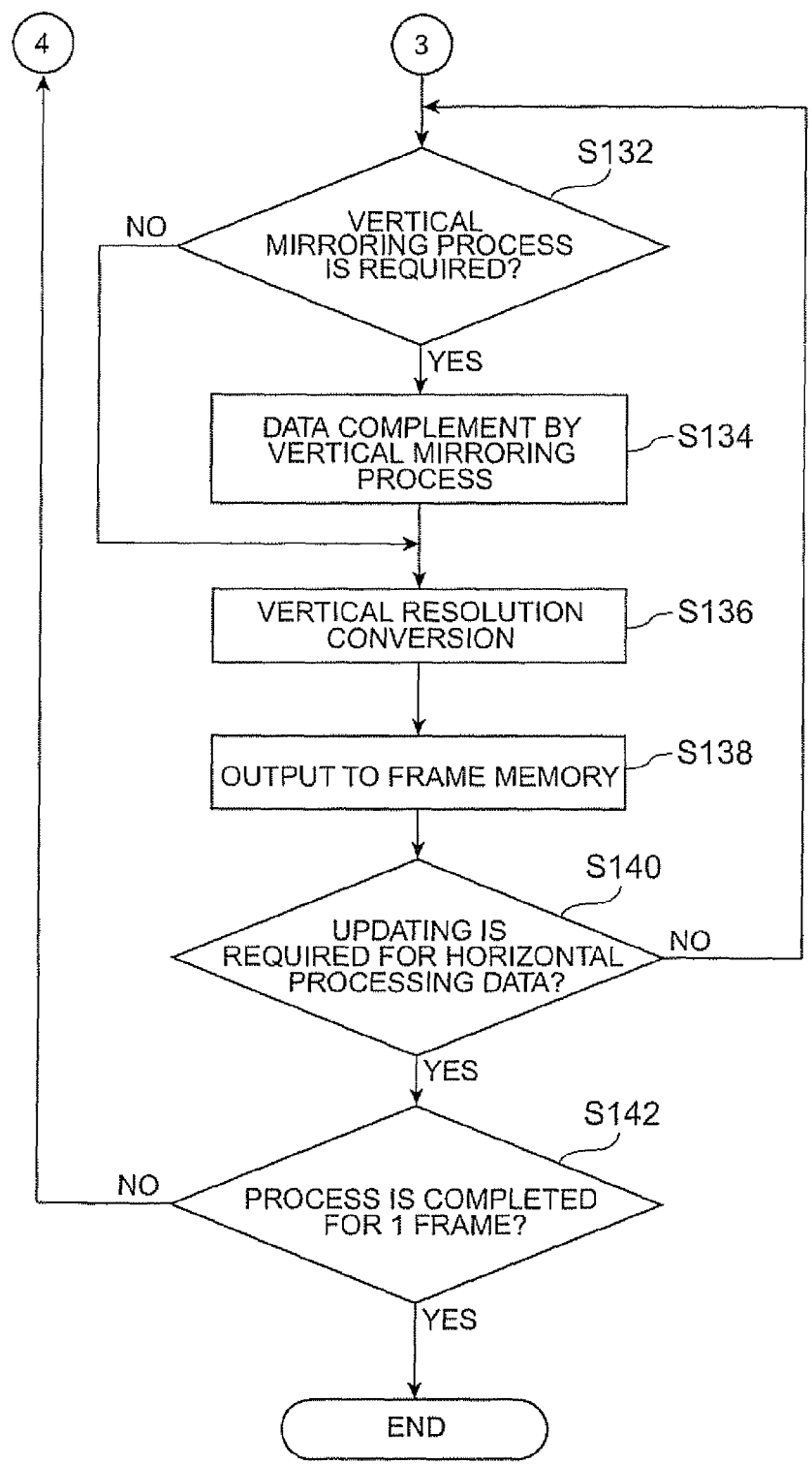
FIG. 9 is still another diagram for illustrating the processing operation of each block in the resolution conversion process by the image processing device 10.

FIGS. 7 to 9 are each a diagram for illustrating the processing operation of each block in a resolution conversion process by the image processing device 10.

First of all, in step S102, the JPEG decoding control section 150 (FIG. 2) of the JPEG decoding section 100 is set with an image size, i.e., width and height, after decoding, a cut-out size, i.e., width and height, and a cut-out start position (BX, BY).

In step S104, the block buffer section 200 and the line buffer section 400 (FIG. 2) are each set with an encoding mode.

After the settings as such are made, the resolution conversion process is started. Note that, in the below, exemplified is a case where an MCU is configured by four blocks of 2 by 2, and a cut-out area is set as shown in FIG. 4B.

In step S106, the JPEG data decoding section 110 (FIG. 2) of the JPEG decoding section 100 performs a decoding process with respect to JPEG image data of an MCU. At this time, the resulting decoded data is forwarded to the MCU buffer section 120 (FIG. 2) of the JPEG decoding section 100, and then is forwarded to the area cut-out section 130 after a complement process in accordance with which encoding mode.

In step S108, the area cut-out section 130 (FIG. 2) of the JPEG decoding section 100 determines whether the blocks configuring the decoding-processed MCU include any block lying on the cut-out area.

When there is no block lying on the cut-out area (step S108: NO), in step S110, the area cut-out section 130 discards the decoded data of all of the blocks configuring the decoding-processed MCU.

On the other hand, when any block lying on the cut-out area is found (step S108: YES), in step S112, the area cut-out section 130 applies a cut-out process to the decoded data of the block(s) lying on the cut-out area. The processing result is then forwarded to the color conversion section 140 (FIG. 2).

Assuming here is that the cut-out area is set as shown in FIG. 4B. In this case, an MCU configured by four blocks under the numbers of 1 to 4, i.e., blocks B00, B10, B01, and B11, includes no cut-out area, and thus the decoded data of these four blocks is discarded. On the other hand, an MCU configured by four blocks under the numbers of 25 to 28, i.e., blocks B22, B32, B23, and B33, includes a part of the cut-out area, and thus the decoded data of the corresponding four blocks is subjected to the cut-out process on a block basis. The processing result is then forwarded to the color conversion section 140.

In step S114, the color conversion section 140 converts the cut-out data of YUV format, i.e., YUV data, provided by the area cut-out section 130 into data of RGB format, i.e., RGB data. Then in step S116, the color conversion section 140 forwards, to the block buffer section 200 (FIG. 1), the cut-out data now being the RGB data as the decoded data being the processing result by the JPEG decoding section 100. Note here that the decoded data forwarded to the block buffer section 200 is stored in the block buffer memory section (FIG. 5) of the block buffer section 200.

Then in step S118, in the block buffer management section 220 of the block buffer section 200, a determination is made whether the decoded process is completed for the number of blocks needed for the horizontal resolution conversion process, and whether the decoded data of the needed number of blocks is stored in the block buffer memory section 210 of the block buffer section 200.

When the decoded data of the needed number of blocks is not yet stored in the block buffer memory section 210, and when the decoding process is not yet completed for the number of blocks needed for the horizontal resolution conversion process (step S118: NO), the procedure returns to step S106, and the decoding process is performed to the next MCU.

On the other hand, when the decoded data of the needed number of blocks is stored in the block buffer memory section 210, and when the decoding process is completed for the number of blocks needed for the horizontal resolution conversion process (step S118: YES), the procedure goes to step S120, and the block buffer section 200 goes through the process in step S120.

Figure 10:
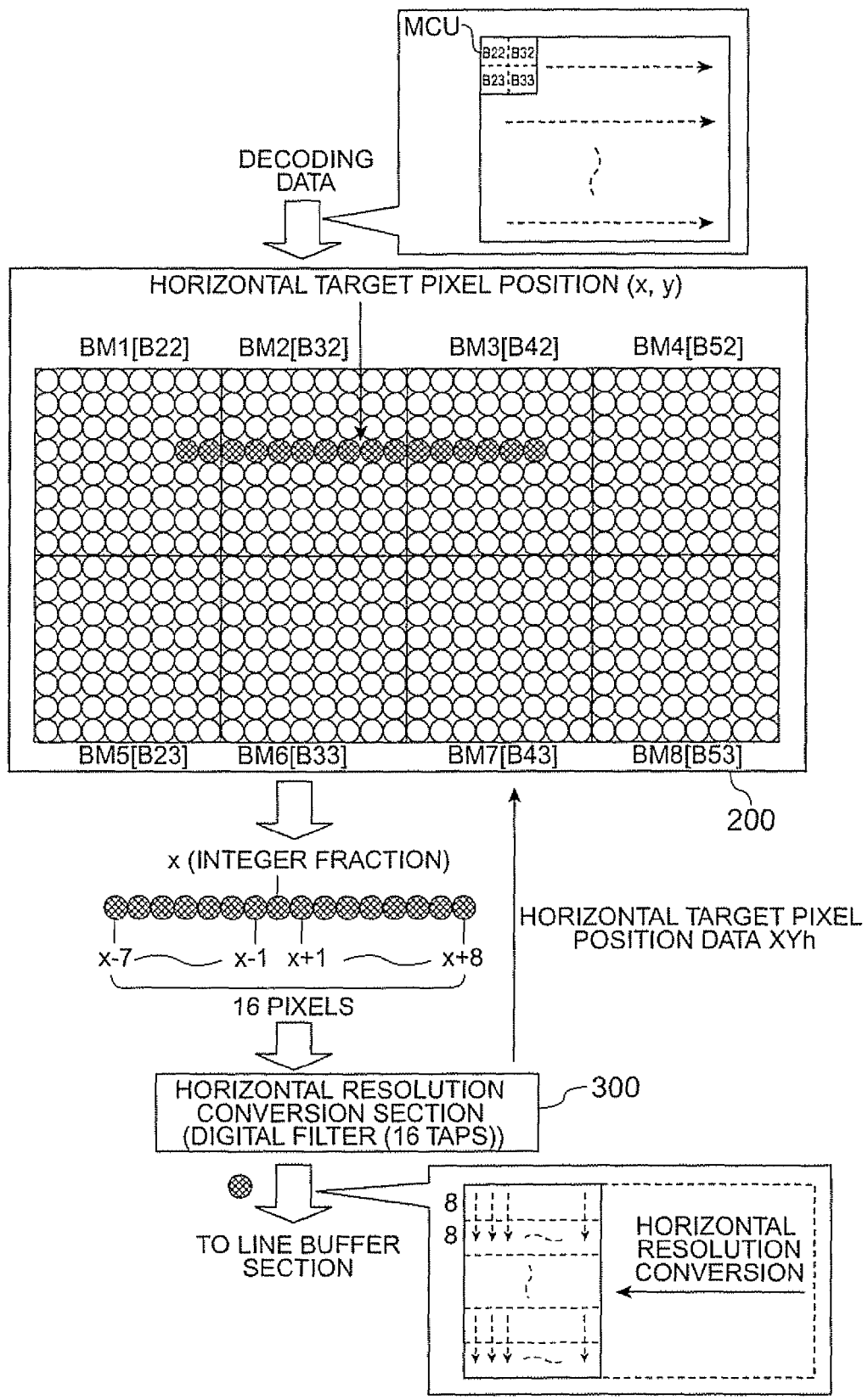
FIG. 10 is a diagram for illustrating a storage process of decoded data to be executed in a block buffer memory section 210 of the block buffer section 200.

FIG. 10 is a diagram for illustrating a storage process of decoded data to be executed in the block buffer memory section 210 of the block buffer section 200. The decoded data coming from the JPEG decoding section 100 is input into the block buffer section 200 for every MCU (2 by 2 blocks) in the order defined with respect to the four blocks configuring an MCU. The decoded data is then stored in the block memories BM1 to BM8 of the block buffer memory section 210. If with the four blocks under the numbers of 25 to 28 configuring the MCU at the head of the cut-out area of FIG. 4B, i.e., blocks B22, B32, B23, and B33, for example, first of all, as shown in FIG. 10A, these blocks are stored in the four block memories BM1, BM2, BM5, and BM6 aligned in two rows and two columns on the left side of the block buffer memory section 210.

As described above, because the horizontal resolution conversion section 300 (FIG. 1) is configured by a digital filter of m (m=16) taps, the image data (decoded data) needed for the horizontal resolution conversion section 300 to generate image data of a horizontal target pixel is of m pixels (16 pixels). As such, the block buffer section 200 is required to output, as horizontal target data, the decoded data that includes the horizontal target pixel position (x, y) and is of m pixels (16 pixels) aligned before and after the horizontal target pixel position in the horizontal direction. This data output is to be made with respect to horizontal target pixel position data XYh coming from the horizontal resolution conversion section 300. Herein, the coordinates represented by the horizontal target pixel position data XYh are those indicated only by integer fractions of the coordinates indicating the actual horizontal target pixel position with negligence of decimal fractions thereof, and the actual horizontal target pixel position is located in the range between the coordinate x being an integer to the next coordinate of x+1. However, if the block buffer section 200 handles the coordinates represented by integers as the coordinates at the horizontal pixel position, there is no problem about the processing in the horizontal resolution conversion section 300. For reflecting the values of decimal fractions of the coordinates (x, y), with respect to the decoded data of 16 pixels input into the horizontal resolution conversion section 300, calculation of the horizontal resolution conversion is performed using the filter efficient weighed by the values of decimal fractions of the coordinates (x, y). In consideration thereof, the coordinates (x, y) represented by the horizontal target pixel position data X are described as the coordinates of the horizontal target pixel position. Note that the decoded data of 16 pixels to be output as the horizontal target data is of 16 pixels (pixels with the x coordinate of x−7 to x+8), i.e., the pixel having the x coordinate represented by the horizontal target pixel position data XYh, seven pixels located forward of the pixel, and eight pixels located rear of the pixel.

In this case, when the coordinates (x, y) represented by the horizontal target pixel position data indicate the decoded data in the block B32 stored in the second block memory BM2 as shown in the drawing, the decoded data of 16 pixels stored in the two block memories BM1 and BM2 and aligned in the horizontal direction is not enough to derive the decoded data of eight pixels located rear of the horizontal target pixel position. This thus needs the decoded data of the block next to the block B32 stored in the second block memory BM2, i.e., B42 (number 29) of FIG. 4B).

In such a state, in step S118, it is determined that the number of blocks needed for the horizontal resolution conversion process is not yet through with the decoding process (step S118: NO), and the procedure returns to step S106 for the decoding process to the next MCU. As a result, as shown in FIG. 10, the four blocks of B42, B52, B43, and B53 configuring the next MCU in the cut-out area of FIG. 4B are stored in the remaining four block memories BM3, BM4, BM7, and BM8.

As described above, when the coordinates (x, y) of the horizontal target pixel position indicate the decoded data in the block B43 stored in the second block memory BM2, the number of blocks newly required for the decoded data is only the block B52 next to the block B42, but the encoded data of four blocks is decoded before output because the decoding process in the JPEG decoding section 100 is performed on an MCU basis. As such, in the block buffer section 200, there needs to store the decoded data in the block buffer memory section 210 on a four-block basis.

With the decoded data of eight blocks found in the two MCUs aligned in a row in the horizontal direction being stored in the block buffer memory section 210 as such, the block buffer section 200 becomes able to provide the decoded data of 16 pixels (with the x coordinate of x−7 to x+8) to the horizontal resolution conversion section 300. The 16 pixels are those corresponding to the coordinates (x, y) of the horizontal pixel position represented by the horizontal target pixel position data XYh asked for by the horizontal resolution conversion section 300. The horizontal resolution conversion section 300 can perform resolution conversion of the image data as a result of decoding by the JPEG decoding section 100 only in the horizontal direction.

Then in step S120, in the block buffer management section 220 of the block buffer section 200, a determination is made whether a horizontal mirroring process is required or not for supplying horizontal target data to the horizontal resolution conversion section 300.

When the horizontal mirroring process is required (step S120: YES), in step S122, the horizontal mirroring process is executed to the decoded data stored in the block buffer memory section 210 so that the data is complemented. As a result, the image data, i.e., decoded data, of 16 pixels aligned in the horizontal direction is forwarded to the horizontal resolution conversion section 300 as the horizontal target data needed for the resolution conversion in the horizontal direction.

On the other hand, when the horizontal mirroring process is not required (step S120: NO), from the block buffer memory section 210, the decoded data of 16 pixels aligned in the horizontal direction is read as the horizontal target data needed for the resolution conversion in the horizontal direction, and the reading result is forwarded to the horizontal resolution conversion section 300.

Figure 11:
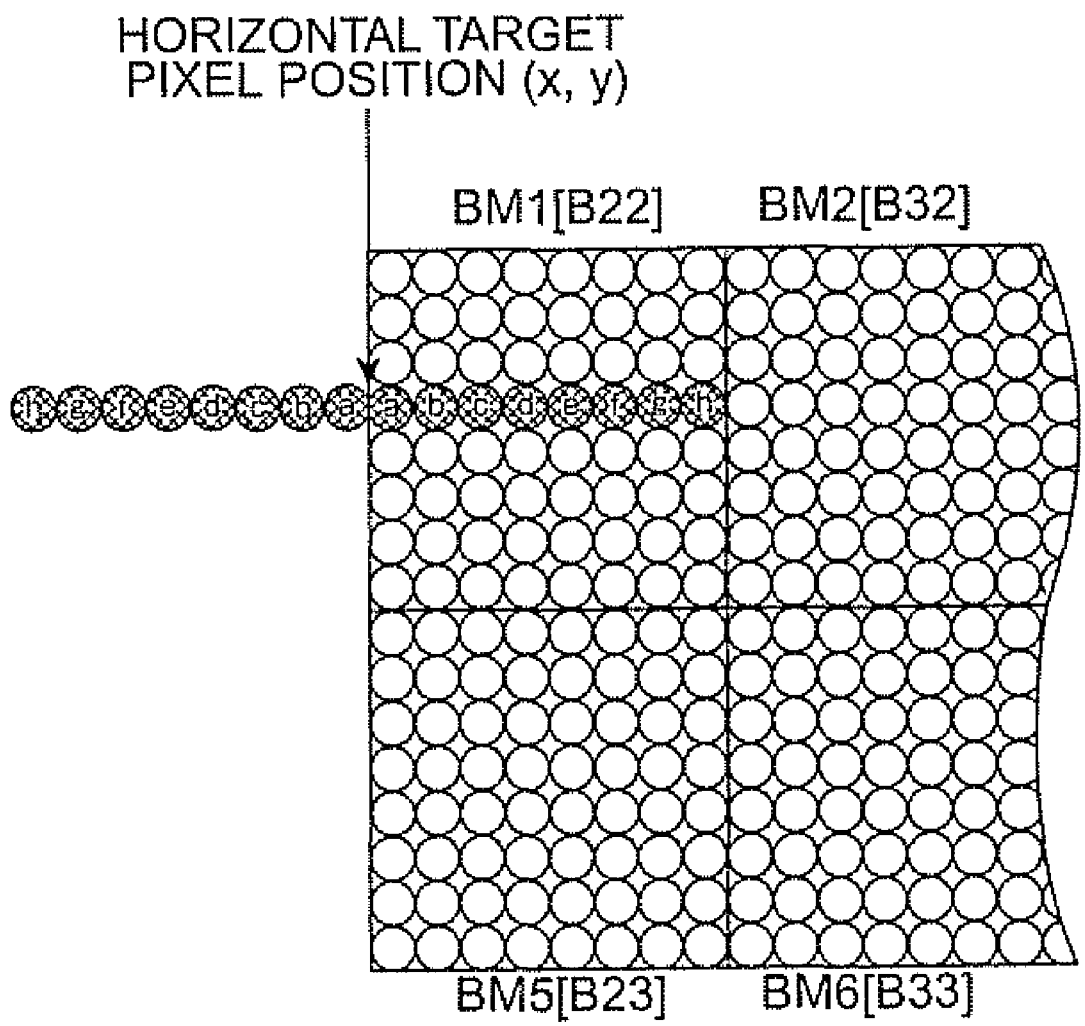
FIG. 11 is a diagram for illustrating a horizontal mirroring process.

FIG. 11 is a diagram for illustrating the horizontal mirroring process. FIG. 11 shows the state in which the four block memories BM1, BM2, BM5, and BM6 store the blocks of the MCU at the head of the cut-out area of FIG. 4B, i.e., the blocks B22 (number 25), B32 (number 26), B23 (number 27), and B33 (number 28).

When the coordinates (x, y) of the horizontal target pixel position indicate the portion corresponding to the left end edge of the image, e.g., the position in the block B22 at the head of the cut-out area as shown in the drawing, some of the corresponding 16 pixels may not be located forward of the pixel with the coordinates. If this is the case, the decoded data of the block B22 is subjected to the mirroring process in the horizontal direction, thereby virtually constructing a block forward of the block B22 for complement of any lacking decoded data. As shown in the drawing, for example, assuming that the pixels in the block B33 of the horizontal row corresponding to the coordinates (x, y) of the horizontal target pixel position are a, b, c, d, e, f, and g in order from the head toward the rear, the block B33 is subjected to the mirroring process so that the pixels in the virtually-constructed block are a, b, c, d, e, f, and g in order toward the front.

In FIG. 11 example, although described is the portion corresponding to the left end edge of the image, the portion corresponding to the right end edge of the image is the same, i.e., data may be implemented by the horizontal mirroring process.

As described above, by applying the horizontal mirroring process to the portions corresponding to the left and right end edges of the image, the image data after horizontal resolution conversion can be protected from deterioration of image quality that is often caused by noise.

Then in step S124, in the horizontal resolution conversion section 300 (FIG. 1), image data corresponding to the horizontal target pixel position is generated using the decoded data of 16 pixels provided by the block buffer section 200 as the horizontal target data, whereby resolution conversion is performed in the horizontal direction.

Then in step S126, in the horizontal resolution conversion section 300, the resulting image data is forwarded to the line buffer section 400 (FIG. 1) as the horizontal processing data as a result of resolution conversion applied to the image data in the horizontal direction.

Then in step S128, in the block buffer management section 220 of the block buffer section 200, a determination is made whether any updating is required for the decoded data stored in the block buffer memory section 210 (FIG. 6) on a block basis.

When no updating is required for the decoded data (step S128: NO), the processes of steps S120 to S126 are repeated.

On the other hand, when updating is required for the decoded data (step S128: YES), in step S130, a determination is made whether the decoding process is completed for the number of lines needed for the vertical resolution conversion process in the line buffer management section 420 (FIG. 6) of the line buffer section 400, and whether the horizontal processing data of the needed number of lines is stored in the line buffer memory section 410 (FIG. 6) of the line buffer section 400.

When the horizontal processing data of any needed number of lines is not yet stored in the line buffer memory section 410, and when the horizontal resolution conversion process is not yet completed for the number of lines needed for the vertical resolution conversion process (step S130: NO), the procedure returns to step S106, and the processes of steps S106 to S128 are repeated.

Figure 12A:
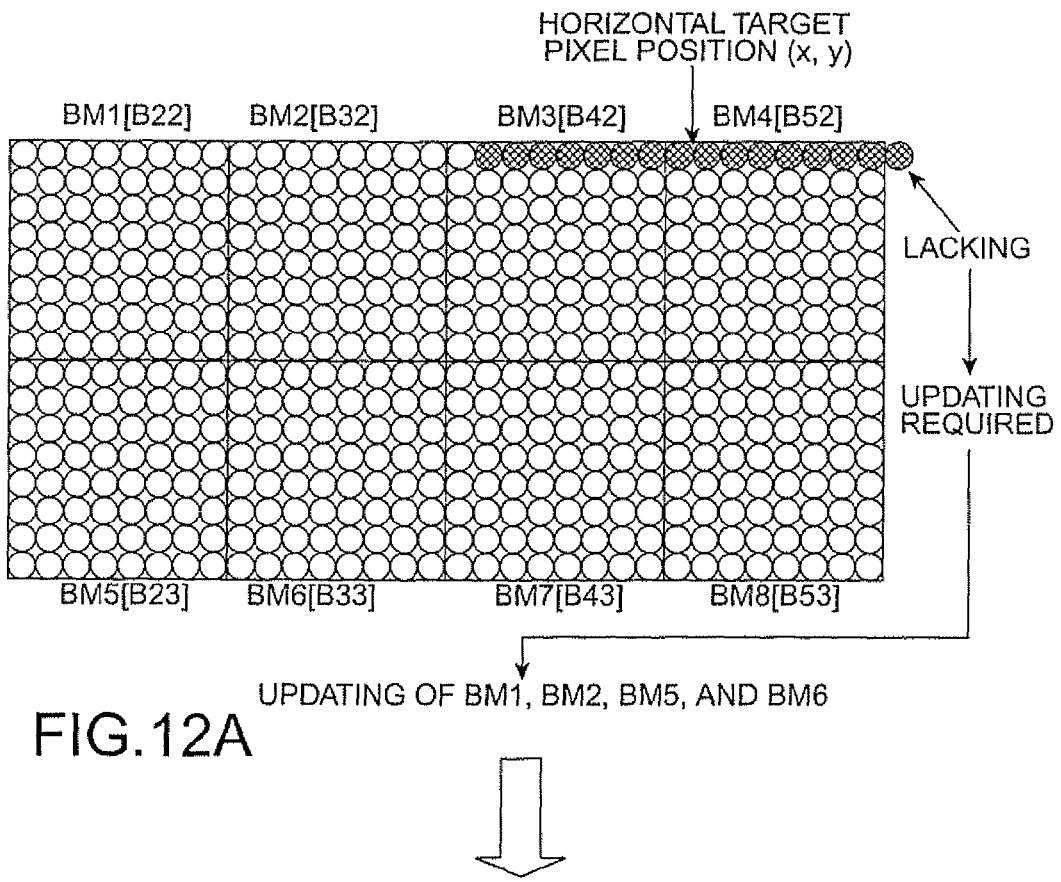
FIGS. 12A and 12B are each a diagram for illustrating updating of decoded data stored in the block buffer memory section 210 on a block basis.
Figure 12B:
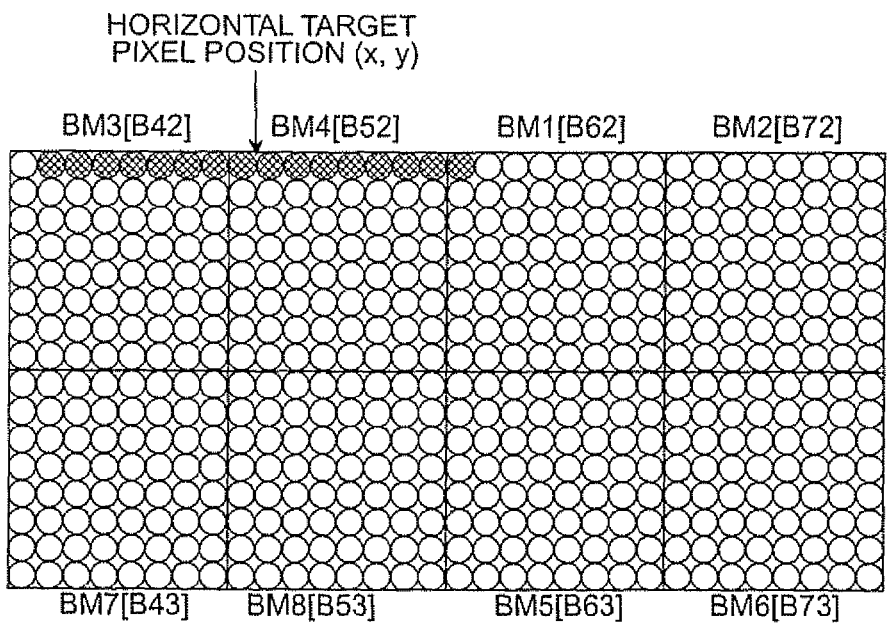

FIGS. 12A and 12B are each a diagram for illustrating updating of decoded data stored in the block buffer memory section 210 on a block basis. When the coordinates represented by the horizontal target pixel position data XYh provided sequentially by the horizontal resolution conversion section 300 indicate the decoded data in the block B62 (FIG. 4B) located at the fourth in the horizontal direction as shown in FIG. 12A due to any sequential change, for example, the number of decoded data needed for resolution conversion is not enough. In such a case, in step S128 described above, a determination is made that updating is required for the decoded data on a block basis (step S128: YES). Then in step S130, another determination is made whether the horizontal resolution conversion process is completed for the number of lines needed for the vertical resolution conversion. Thereafter, the procedure returns to step S106 to start the decoding process for the next MCU. In this manner, as shown in FIG. 12B, the four block memories BM1, BM2, BM5, and BM6 having been stored the decoded data that is not needed any more are updated, and the decoded data in the four blocks B62, B72, B63, and B73 as a result of the decoding process for the next MCU is stored. As such, the image data, i.e., decoded data, stored in the eight block memories BM1 to BM8 of the block buffer memory section 210 can be accordingly updated. Note here that, in FIG. 22B, for easy understanding of the arrangement order of the blocks in the horizontal direction, for convenience, the four block memories BM3, BM4, BM7, and BM8 are disposed on the front side, and the four other block memories BM1, BM2, BM5, and BM6 are disposed on the rear side.

On the other hand, in step S130, when the horizontal processing data of any needed number of lines is stored in the line buffer section 410, and when the horizontal resolution conversion process is completed for the number of lines needed for the vertical resolution conversion process (step S130: YES), the process of the next step S132 (will be described later) is performed in the line buffer section 400.

Figure 13:
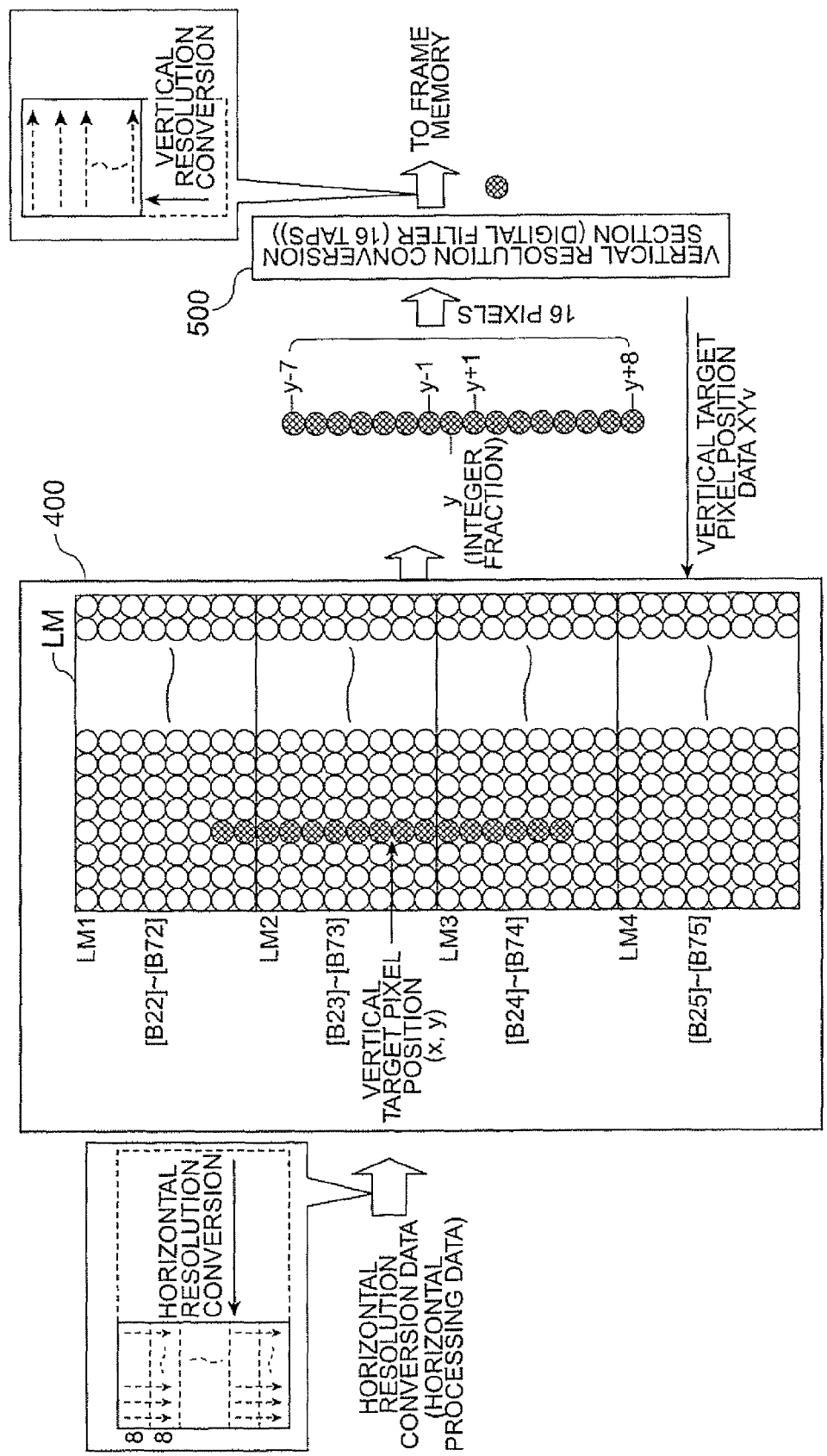
FIG. 13 is a diagram for illustrating a storage process of horizontal processing data to be executed in a line buffer memory section 410 of the line buffer section 400.

FIG. 13 is a diagram for illustrating a storage process of horizontal processing data to be executed in the line buffer memory section 410 of the line buffer section 400. The horizontal processing data coming from the horizontal resolution conversion section 300 is stored in the line blocks LM1 to LM4 of the line buffer memory section 410 on the basis of the number of lines corresponding to the two blocks not yet through with resolution conversion in the vertical direction, i.e., 8 by 2 lines (16 lines). For example, the horizontal processing data as a result of horizontal resolution conversion applied to the decoded data of eight blocks of the top horizontal row of the cut-out area of FIG. 4B, i.e., blocks B22 (number 25), B32 (number 26), B42 (number 29), B52 (number 30), B62 (number 33), and B72 (number 34), is stored in the first line block LM1. The horizontal processing data as a result of horizontal resolution conversion applied to the decoded data of eight blocks of the second horizontal row of the cut-out area of FIG. 4B, i.e., blocks B23 (number 27), B33 (number 28), B43 (number 31), B53 (number 32), B63 (number 35), and B73 (number 36), is stored in the second line block LM2.

As described above, because the vertical resolution conversion section 500 (FIG. 1) is configured by a digital filter of n (n=16) taps, the image data, i.e., horizontal processing data, needed for the vertical resolution conversion section 500 to generate image data of a vertical target pixel is n pixels (16 pixels). As such, the line buffer section 400 is required to output, as vertical target data, the horizontal processing data that includes the vertical target pixel position (x, y) and is of n pixels (16 pixels) aligned above and below the vertical target pixel position in the vertical direction. This data output is to be made with respect to the vertical target pixel position data XYv coming from the vertical resolution conversion section 500. Herein, similarly to the horizontal target pixel position data XYh, the coordinates represented by the vertical target pixel position data XYv are those indicated only by integer fractions of the coordinates indicating the actual vertical target pixel position with negligence of decimal fractions thereof and the actual vertical target pixel position is located in the range between the coordinate y being an integer to the next coordinate of y+1. However, if the line buffer section 400 handles the coordinates represented by integers as the coordinates at the vertical pixel position, there is no problem about the processing in the vertical resolution conversion section 500. For reflecting the values of decimal fractions of the coordinates (x, y), with respect to the decoded data of 16 pixels input into the vertical resolution conversion section 500, calculation of the vertical resolution conversion is performed using the filter efficient weighed by the values of decimal fractions of the coordinates (x, y). In consideration thereof, the coordinates (x, y) represented by the vertical target pixel position data XYh are described as the coordinates of the vertical target pixel position. Note that the horizontal processing data of 16 pixels to be output as the vertical target data is of 16 pixels (pixels with the y coordinate of y−7 to y+8), i.e., the pixel having the y coordinate represented by the vertical target pixel position data XYv, seven pixels located above of the pixel, and eight pixels located below of the pixel.

In this case, when the coordinates (x, y) represented by the vertical target pixel position data XYv indicate the horizontal processing data stored in the second line block LM2 as shown in the drawing, i.e., image data as a result of horizontal resolution conversion applied to the eight blocks of B23 to B73 aligned in the horizontal row of the second block of the cut-out area of FIG. 4B, the horizontal processing data of 16 pixels stored in the two line blocks LM1 and LM2 and aligned in the vertical direction is not enough to derive the decoded data of eight pixels located below of the vertical target pixel position. This thus needs the horizontal processing data in the horizontal row of the block next to the horizontal row of the block corresponding to the horizontal processing data stored in the second line block LM2, e.g., blocks B24, B34, B44, B54, B64, and B74 aligned in the horizontal row of the third block in the cut-out area of FIG. 4B.

In such a state, in step S130, it is determined that the number of lines needed for the vertical resolution conversion process is not yet through with the decoding process (step S130: NO), and the procedure returns to step S106 for the decoding process to the next MCU. As a result, as shown in FIG. 13, for example, the horizontal processing data corresponding to the blocks aligned in the horizontal row of the third block in the cut-out area of FIG. 4B, e.g., blocks of B24, B34, B44, B54, B64, and B74, is stored in the third line block LM3, and the horizontal processing data corresponding to the blocks aligned in the horizontal row of the fourth block in the cut-out area of FIG. 4B, e.g., blocks of B25, B35, B45, B55, B65, and B75, is stored in the fourth line block LM4.

Note here that, as described above, when the coordinate (x, y) of the vertical target pixel position indicate the horizontal processing data stored in the second line block LM2, the number of lines newly required for the horizontal processing data is equal to the number of horizontal rows of the next block, i.e., the horizontal processing data of eight lines, but the decoding process to be executed by the JPEG decoding section 100 is performed for every MCU configured by 2 by 2 blocks as described above. Accordingly, from the horizontal resolution conversion section 300, the horizontal processing data of the number of lines corresponding to the horizontal rows of the two blocks aligned in the vertical direction, i.e., 16 lines, is output. As such, in the line buffer section 400, there needs to store in advance the horizontal processing data of lines corresponding to the horizontal rows of the four blocks, i.e., 8 by 4 (=32) lines, in the line buffer section 410.

With the horizontal processing data of 32 lines corresponding to the horizontal rows of the four blocks located in a row in the vertical direction being stored in the line buffer memory section 410 as such, the vertical resolution conversion section 500 becomes able to provide the horizontal professing data of 16 pixels (with the y coordinate of y−7 to y+8) to the vertical resolution conversion section 500. The 16 pixels are those corresponding to the coordinates (x, y) of the vertical target pixel position represented by the vertical target pixel position data XYv asked for by the vertical resolution conversion section 500. The vertical resolution conversion section 500 then can perform resolution conversion of the image data as a result of horizontal resolution conversion by the horizontal resolution conversion section 300 in the vertical direction.

Then in step S132, in the line buffer management section 420 of the line buffer section 400, a determination is made whether a vertical mirroring process is required or not for supplying vertical target data to the vertical resolution conversion section 500.

When the vertical mirroring process is required (step S132: YES), in step S134, the vertical mirroring process is executed to the horizontal processing data stored in the line buffer memory section 410 so that the data is complemented. As a result, the image data, i.e., horizontal processing data, of 16 pixels aligned in the vertical direction is forwarded to the vertical resolution conversion section 500 as the vertical target data needed for the resolution conversion in the vertical direction.

On the other hand, when the vertical mirroring process is not required (step S132: NO), from the line buffer memory section 410, the horizontal processing data of 16 pixels aligned in the vertical direction is read as the vertical target data needed for the resolution conversion in the vertical direction, and the reading result is forwarded to the vertical resolution conversion section 500.

Note that this vertical mirroring process is similar to the above-described horizontal mirroring process to be executed in the block buffer memory section 210 except it is executed to portions corresponding to the upper and lower end edges of an image, and share the same purpose and effects, thereby being not described twice.

Then in step S136, in the vertical resolution conversion section 500, image data corresponding to the vertical target pixel position is generated using the horizontal processing data of 16 pixels provided by the line buffer section 400 as the vertical target data, whereby resolution conversion is performed in the vertical direction.

Then in step S138, in the vertical resolution conversion section 500, the resulting image data through with resolution conversion is forwarded to a frame memory.

Then in step S140, in the line buffer section 400, a determination is made whether any updating is required for the horizontal processing data stored in the line buffer memory section 410 on a line basis.

When no updating is required for the horizontal processing data (step S140: NO), the processes of steps S132 to S138 are repeated.

On the other hand, when updating is required for the horizontal processing data (step S140: YES), in step S142, another determination is made whether the process of a frame, i.e., the process of an image, is through or not.

When the determination result tells that the process of an image is not through yet (step S142: NO), the procedure returns to step S106, and the processes of steps S106 to S140 are repeated.

On the other hand, when the determination result tells that the process of an image is through (step S142: YES), this is the end of the resolution conversion processing operation.

Note here that such a determination about updating of the horizontal processing data in step S140 can be made in the procedure similar to the determination about updating the decoded data in step S128 described above, and no description is given herein.

As described above, with the image processing device as the resolution conversion device in the above embodiment, the encoded image data of a JPEG format is decoded on an MCU basis, and at the same time, the resulting decoded image data is sequentially subjected to resolution conversion, thereby being able to perform resolution conversion with good efficiency while suppressing generation of any block noise using a memory of small capacity.

Moreover, with the image processing device, from any image data through with the decoding process, only a portion corresponding to any set cut-out area can be cut out for resolution conversion in a sequential manner. This accordingly eliminates the need to apply resolution conversion to any unneeded portion, thereby being able to perform resolution conversion with good efficiency.

C. Modified Example

Note here that any components in the above embodiment other than those claimed in the independent claim are all optional, and can be omitted as appropriate. While the invention has been described in detail, the foregoing description is in all aspects illustrative and not restrictive. It is understood that numerous other modifications and variations can be devised without departing from the scope of the invention, and the following modifications are possible, for example.

C1. MODIFIED EXAMPLE 1

Exemplified in the above embodiment is the case where an MCU is configured by an array of 2 by 2 blocks. This is surely not restrictive, and the invention is also applicable to a case where an MCU is configured by four blocks aligned in the horizontal direction. If this is the configuration, the number of block memories for provision to the block buffer memory section may be three at the minimum, and the number of lines in the line memory for provision to the line buffer section may be 24 lines.

C2. MODIFIED EXAMPLE 2

Exemplified in the above embodiment is the block configured by 8 by 8 pixels. This is surely not restrictive and a block may be configured by p by q pixels (where p and q are each an integer of 2 or larger). If this is the configuration, however, the size of a block is preferably used as a basis to change the configuration of a block memory included in the block buffer memory section in the block buffer section, and to change the configuration of a line memory included in the line buffer memory section in the line buffer section.

Alternatively, the MCU may take various types of configuration. If this is the case, similarly, the configuration of an MCU is preferably used as a basis to change the configuration of a block memory for provision in the block buffer memory section of the block buffer section, or to change the configuration of a line memory for provision in the line buffer memory section of the line buffer section.

C3. MODIFIED EXAMPLE 3

In the above embodiment, exemplified is the case of resolution conversion by cutting out, from image data (decoded image data) of any arbitrary image size, image data (decoded image data) including an image of a preset cut-out size. This is surely not restrictive, and by making the cut-out size same as the image size, resolution conversion becomes possible not for any cut-out image data but for image data of any arbitrary image size. Herein, if no image cut-out is required, the area cut-out section may not be provided for provision to the JPEG decoding section.

C4. MODIFIED EXAMPLE 4

Exemplified in the above embodiment is the configuration of including the color conversion section that converts YUV data into RGB data. This is surely not restrictive, and the color conversion section may not be provided.

C5. MODIFIED EXAMPLE 5

The image processing device of the above embodiment is exemplified as configuring a part of an image processing apparatus for use in a projector. This is surely not restrictive, and the device may be applied as a component of an image processing apparatus configuring various types of devices such as any other image display device and printing device.

What is claimed is:

1. An image processing device that decodes encoded image data, and converts a resolution of the decoded image data, the encoded image data being formed by encoding image data partitioned into blocks that are arranged in a rectangular array extending in a horizontal and a vertical direction, and each block including a plurality of pixels aligned in a shape of a matrix having horizontal rows and vertical columns, the image processing device comprising:
a decoding section that cuts out, while decoding the encoded image data, a portion of the decoded image data corresponding to a preset cut-out area, and outputs the portion of the decoded image data in order on a block-by-block basis;
a block buffer section that temporarily stores, on a basis of the blocks, at least a part of the blocks of at least one horizontal row of the rectangular array out of the portion of the decoded image data cut out in order on the block-by-block basis in accordance with an order of arrangement of the blocks in the rectangular array;
a horizontal resolution conversion section that converts the resolution of the portion of the decoded image data in the horizontal direction by filtering a part of the blocks of the decoded image data stored in the block buffer section corresponding to pixels aligned in a same horizontal row;
a line buffer section that temporarily stores, on a basis of the vertical columns, horizontal-resolution-converted image data that corresponds to at least part of the vertical columns out of horizontal-resolution-converted image data that results from the horizontal resolution conversion performed by the horizontal resolution conversion section and that is configured by the image data of the pixels aligned in the matrix of the horizontal rows and the vertical columns; and a vertical resolution conversion section that converts the resolution of the horizontal-resolution-converted image data in the vertical direction by filtering, the horizontal-resolution-converted image data stored in the line buffer section that forms part of the vertical columns, the filtered horizontal-resolution-converted image data corresponding to the pixels aligned in a same vertical column.

2. The image processing device according to claim 1, the decoding section determining, on the basis of the blocks, whether the decoded image data lies within the cut-out area, and only cutting out from the decoded image data and outputting in order on the block-by-block basis blocks determined as lying within the cut-out area.

3. The image processing device according to claim 1, in response to a request issued from the horizontal resolution conversion section, the block buffer section reading any part of the blocks of decoded image data temporarily stored in the block buffer section that correspond to any of a number of pixels needed for horizontal resolution conversion and outputting a result of the reading to the horizontal resolution conversion section.

4. The image processing device according to claim 3, when the number of pixels needed for horizontal resolution conversion includes pixels that are located left of a left end of an image of the image data or located right of a right end of the image of the image data, the block buffer section performing a horizontal mirroring process that allocates, to the pixels located left of the left end, the portion of the decoded image data of the pixels aligned in the same horizontal row from the left end toward the right end in a reverse order, and allocating to the pixels located right of the right end, the portion of the decoded image data of the pixels aligned in the same horizontal row from the right end toward the left end in a reverse order.

5. The image processing device according to claim 1, in response to a request issued from the vertical resolution conversion section, the line buffer section reading any part of horizontal-resolution-converted image data temporarily stored in the line buffer section corresponding to any of a number of pixels needed for vertical resolution conversion and outputting a result of the reading to the vertical resolution conversion section.

6. The image processing device according to claim 5, when the number of pixels needed for vertical resolution conversion includes pixels that are located above an upper end of an image of the image data or located below a lower end of the image of the image data, the line buffer section performing a vertical mirroring process that allocates, to the pixels located above the upper end, the horizontal-resolution-converted image data of the pixels aligned in the same vertical column from the upper end toward the lower end in a reverse order, and allocates to the pixels located below the lower end, the horizontal-resolution-converted image data of the pixels aligned in the same vertical column from the lower end in the upward direction in a reverse order.

7. An image processing method of decoding encoded image data, and converting a resolution of the decoded image data, the encoded image data being formed by encoding image data partitioned into, blocks that are arranged in a rectangular array extending in a horizontal and a vertical direction, and each block including a plurality of pixels aligned in a shape of a matrix having horizontal rows and vertical columns, the image processing method comprising:
cutting out, while decoding the encoded, image data, a portion of the decoded image data corresponding to a preset cut-out area;
temporarily storing, on a basis of the blocks, at least part of the blocks of at least one horizontal row of the rectangular array out of the portion of the decoded image data cut out in order on a block-by-block basis in accordance with an order of arrangement of the blocks in the rectangular array;
converting the resolution of the portion of the decoded image data in the horizontal direction by filtering a part of the blocks of the decoded image data temporarily stored corresponding to pixels that are aligned in a same horizontal row;
temporarily storing, on a basis of the vertical columns, horizontal-resolution-converted image data that corresponds to at least part of the vertical columns out of horizontal-resolution-converted image data that results from the horizontal resolution conversion and that is configured by the image data of the pixels aligned in the matrix of the horizontal rows and the vertical columns; and
converting the resolution of the horizontal-resolution-converted image data in the vertical direction by filtering the horizontal-resolution-converted image data that is stored in a temporary storage and that forms part of the horizontal rows, the filtered horizontal-resolution-converted image data corresponding to the pixels aligned in a same vertical column.

8. The image processing device according to claim 1, the block buffer section determining that the number of blocks of the decoded image data stored in the block buffer section is not sufficient for the horizontal resolution section to perform the horizontal resolution conversion, and the decoding section cutting out and outputting and the buffer section storing an additional number of blocks of the decoding image data needed to perform the horizontal resolution conversion.

9. The image processing device according to claim 1, the line buffer section determining that a number of lines of horizontal-resolution-converted image data needed for vertical resolution conversion is not sufficient and determining that the horizontal resolution conversion section has not converted the resolution of a number of blocks of decoded image data required to create the number of lines of horizontal-resolution-converted image data needed for the vertical resolution conversion, and the decoding section cutting out and outputting and the block buffer section storing an additional number of blocks of decoded image data, and the horizontal resolution conversion section converting the additional number of blocks to create the number of lines of horizontal-resolution-converted image data needed for the vertical resolution conversion.

10. The image processing device according to claim 1, each block being identified by a pair of coordinates (X,Y) assigned to an upper left corner of the block and each pixel within each block being identified by a pair of coordinates (x, y) indicating a position of the pixel.

11. The image processing device according to claim 3, the number of pixels needed for horizontal resolution conversion being determined in accordance with a digital filter value m.

12. The image processing device according to claim 1, the number of pixels needed for horizontal resolution conversion including a horizontal target pixel and (m−1) additional pixels, each of the (m−1) additional pixels being aligned either to the left or right of the horizontal target pixel in the same horizontal row.

13. The image processing device according to claim 5, the number of pixels needed for vertical resolution conversion being determined in accordance with a digital filter value n.

14. The image processing device according to claim 13, the number of pixels needed for vertical resolution conversion including a vertical target pixel and (n−1) additional pixels, each of the (n−1) additional pixels being aligned either to above or below the vertical target pixel in the same vertical column.

15. An image processing device that decodes encoded image data, and converts a resolution of the decoded image data, the encoded image data being formed by encoding image data partitioned into blocks that are arranged in a rectangular array extending in a horizontal and a vertical direction, each of the blocks including a plurality of pixels aligned in a matrix shape having horizontal rows and vertical columns, the image processing device comprising:

a decoding section that decodes blocks of the encoded image data based on an MCU and cuts out and outputs corresponding blocks of the decoded image data that lie within a preset cut-out area of the decoded image data, the MCU corresponding to a predetermined number and arrangement of blocks;

a block buffer section that receives and temporarily stores the cut-out blocks of the decoded image data outputted by the decoding section in blocks of memory;

a horizontal resolution conversion section that converts the resolution of the blocks of the decoded image data stored in the block buffer section in the horizontal direction by filtering pixels of the blocks that are aligned in a same row;

a line buffer section that temporarily stores lines of horizontal-resolution-converted image data that correspond to the rows of pixels of the blocks of decoded image data that have undergone horizontal resolution conversion by the horizontal resolution conversion section and arranges the lines in an order corresponding to an order of the rows of pixels in the blocks of decoded image data; and a vertical resolution conversion section that converts the resolution of the horizontal-resolution-converted image data in the vertical direction by filtering pixels aligned in a same vertical column of the lines of horizontal-resolution-converted image data stored in the line buffer section.

16. The image processing device according to claim 15, the decoding section comprising:

a data decoding section that decodes encoded image data received from an output device;

a MCU buffer section that receives the decoded data from the data decoding section and creates decoded complement data;

a cut-out section that determines whether any blocks of the decoded complement data lie within the cut-out area and cuts out blocks lying within the cut-out area and discards blocks lying outside the cut-out area;

a color conversion section that receives the cut out blocks of the decoded complement data from the cut-out section and converts the data to RGB data that is output as the decoded image data; and a decoding control section that initiates a decoding process by which the decoding section decodes the encoded image data and cuts out a portion of the decoded image data corresponding to a preset cut-out area.

17. The image processing device according to claim 15, the MCU comprising four blocks arranged in a 2-by-2 matrix.

18. The image processing device according to claim 15, the plurality of pixels of each block being arranged in a matrix shape having 8 rows and 8 columns.

19. The image processing device according to claim 15, the block buffer section determining that the number of blocks of the decoded image data stored in the block buffer section is not sufficient for the horizontal resolution section to perform the horizontal resolution conversion, and the decoding section cutting out and outputting and the buffer section storing an additional number of blocks of the decoded image data needed to perform the horizontal resolution conversion, the additional number of blocks being determined based on the MCU.

20. The image processing device according to claim 15, the line buffer section determining that a number of lines of horizontal-resolution-converted image data needed for vertical resolution conversion is not sufficient and determining that the horizontal resolution conversion section has not converted the resolution of a number of blocks of decoded image data required to create the number of lines of horizontal-resolution-converted image data needed for the vertical resolution conversion, and the decoding section cutting out and outputting and the block buffer section storing additional blocks of decoded image data, an additional number of blocks of decoded image data, the additional number of blocks being determined based on the MCU, and the horizontal resolution conversion section converting the additional number of blocks of decoded image data to create the number of lines of horizontal-resolution-converted image data needed for the vertical resolution conversion.

* * * * *